US012663997B2

(12) United States Patent

Govindarajan et al.

(10) Patent No.: US 12,663,997 B2

(45) Date of Patent: Jun. 23, 2026

(54) METHODS AND APPARATUS TO BOOT FROM BLOCK DEVICES

(71) Applicant: Texas Instruments Incorporated, Dallas, TX (US)

(72) Inventors: Sriramakrishnan Govindarajan, Bangalore (IN); Mihir Narendra Mody, Bangalore (IN); Prithvi Shankar Yeyyadi Anantha, Bangalore (IN); Shailesh Ghotgalkar, Bengaluru (IN); Kedar Chitnis, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/809,646

(22) Filed: Aug. 20, 2024

(65) Prior Publication Data

US 2024/0411563 A1 Dec. 12, 2024

Related U.S. Application Data

(62) Division of application No. 17/721,534, filed on Apr. 15, 2022, now Pat. No. 12,093,697.

(51) Int. Cl.

| | |
|---|---|
| *G06F 9/4401* | (2018.01) |
| *G06F 12/14* | (2006.01) |
| *G06F 21/57* | (2013.01) |
| *G06F 21/78* | (2013.01) |
| *H04L 9/32* | (2006.01) |

(52) U.S. Cl.
CPC ............ *G06F 9/4401* (2013.01); *G06F 12/14* (2013.01); *G06F 12/1416* (2013.01); *G06F 12/1483* (2013.01); *G06F 21/57* (2013.01); *H04L 9/3247* (2013.01); *G06F 21/78* (2013.01)

(58) Field of Classification Search
CPC .... G06F 9/4401; G06F 12/0246; G06F 12/14; G06F 12/1416; G06F 12/1483; G06F 13/28; G06F 13/34; G06F 21/57; G06F 21/78; G06F 2212/1024; G06F 2212/1052; G06F 2212/7201; G06F 2212/7204; G06F 2212/7208; H04L 9/3247; H04L 9/0897
See application file for complete search history.

(56) References Cited

U.S. PATENT DOCUMENTS

| | | | | |
|---|---|---|---|---|
| 6,233,645 B1 * | 5/2001 | Chrysos | ................ | G06F 9/5016 712/E9.055 |
| 9,952,991 B1 * | 4/2018 | Bruce | ..................... | H04L 47/10 |
| 11,474,826 B1 | 10/2022 | Malladi | | |
| 2003/0122834 A1 * | 7/2003 | Mastronarde | .......... | G06F 13/18 711/151 |
| 2017/0147219 A1 * | 5/2017 | Leggette | ............... | G06F 3/0688 |
| 2017/0286239 A1 * | 10/2017 | Baptist | .................... | G06F 3/061 |
| 2020/0110880 A1 | 4/2020 | Ghetie | | |
| 2021/0286520 A1 * | 9/2021 | Baptist | ................... | G06F 3/067 |

* cited by examiner

*Primary Examiner* — Aracelis Ruiz

(74) *Attorney, Agent, or Firm* — Michael T. Gabrik; Frank D. Cimino

(57) ABSTRACT

An example device includes a first interface configured to couple to a first memory that is configured to store an image that includes a set of slices; a second interface configured to couple to a second memory; and a direct memory access circuit coupled to the first and second interfaces. The direct memory access circuit receives a transaction that specifies a read of a slice of the set of slices; and based on the transaction, reads the slice from the first memory; performs operations to the slice; and stores the slice in the second memory.

11 Claims, 10 Drawing Sheets

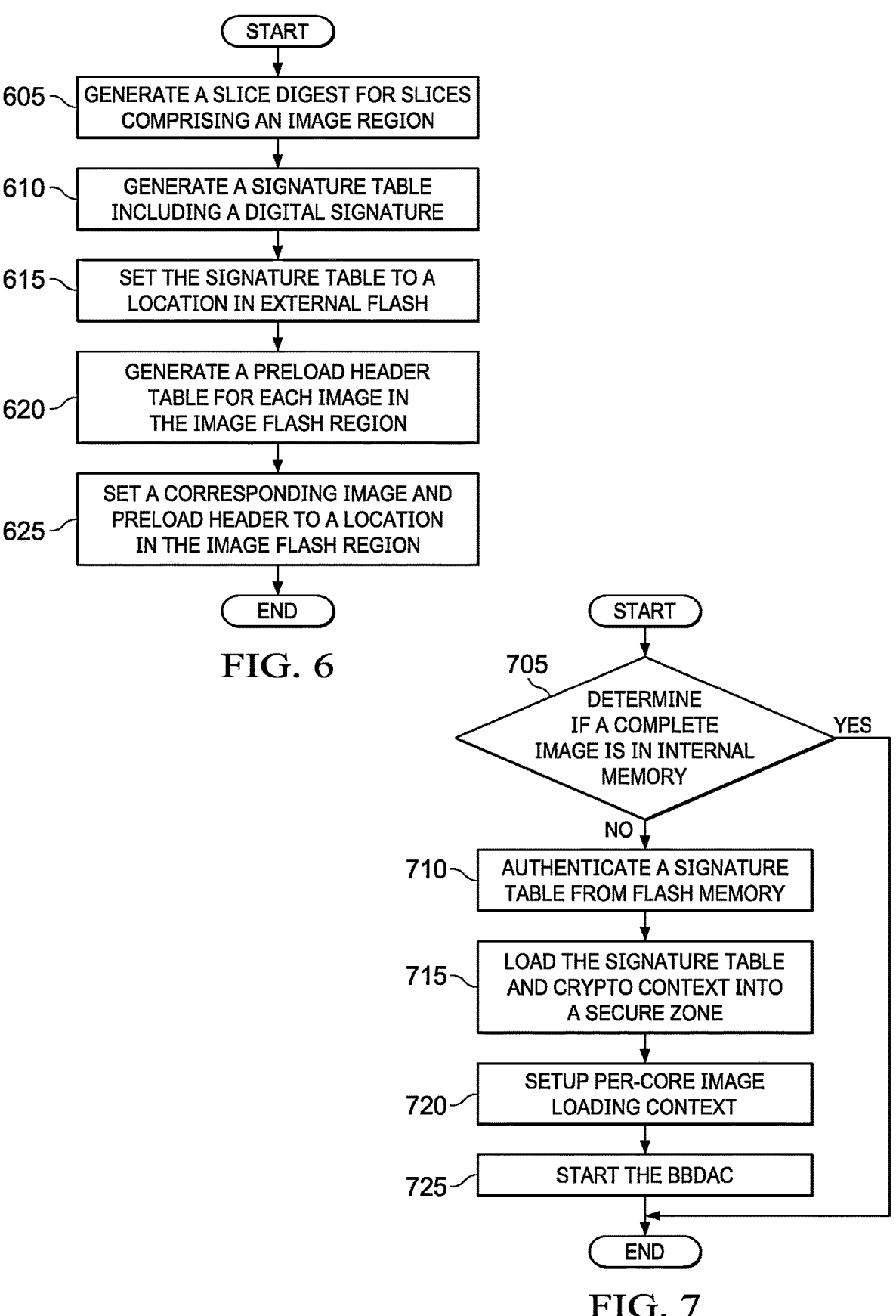

START

605 — GENERATE A SLICE DIGEST FOR SLICES COMPRISING AN IMAGE REGION

610 — GENERATE A SIGNATURE TABLE INCLUDING A DIGITAL SIGNATURE

615 — SET THE SIGNATURE TABLE TO A LOCATION IN EXTERNAL FLASH

620 — GENERATE A PRELOAD HEADER TABLE FOR EACH IMAGE IN THE IMAGE FLASH REGION

625 — SET A CORRESPONDING IMAGE AND PRELOAD HEADER TO A LOCATION IN THE IMAGE FLASH REGION

END

FIG. 6

START

705 — DETERMINE IF A COMPLETE IMAGE IS IN INTERNAL MEMORY

YES

NO

710 — AUTHENTICATE A SIGNATURE TABLE FROM FLASH MEMORY

715 — LOAD THE SIGNATURE TABLE AND CRYPTO CONTEXT INTO A SECURE ZONE

720 — SETUP PER-CORE IMAGE LOADING CONTEXT

725 — START THE BBDAC

END

FIG. 7

METHODS AND APPARATUS TO BOOT FROM BLOCK DEVICES

CROSS-REFERENCE TO RELATED APPLICATION(S)

This application is a divisional of application Ser. No. 17/721,534, filed Apr. 15, 2022, the content of which is incorporated by reference herein in its entirety.

BACKGROUND

This description relates generally to booting from external flash, and more particularly to methods and apparatus to boot from block devices. Traditional microcontroller units (MCUs) include integrated flash configured as a boot medium for execute in place operations. Some MCUs include a central processing unit (CPU) that may include a plurality of compute cores. Multi-core MCUs may require that each compute core have a separate boot image in order to process operations of an application. The plurality of boot images utilized for multi-core MCUs may require the MCU to have access to increased amounts of flash in order to store the multiple boot images. Some multi-core MCUs include methods to boot from external flash (e.g., a NAND flash device, a NOR flash device, etc.) to compensate for the increase in flash memory.

SUMMARY

Devices and methods to boot from block devices are provided. An example device includes a first interface configured to couple to a first memory configured to store an image that includes a set of slices; a second interface configured to couple to a second memory; and a direct memory access circuit coupled to the first and second interfaces and configured to receive a transaction that specifies a read of a slice of the set of slices; and based on transaction read the slice from the first memory; perform operations to the slice; and store the slice in the second memory.

BRIEF DESCRIPTION OF THE DRAWINGS

FIG. 6 is a flowchart representative of an example process that may be performed using machine readable instructions that can be executed and/or hardware configured to implement the boot from block device accelerator of FIG. 1, and/or, more generally, to generate a signature table and/or the preload headers of FIG. 4.

FIG. 7 is a flowchart representative of an example process that may be performed using machine readable instructions that can be executed and/or hardware configured to implement the boot from block device accelerator of FIG. 1, and/or, more generally, to start the boot from block device accelerator after a reset of the microcontroller unit of FIG. 1.

The same reference numbers or other reference designators are used in the drawings to designate the same or similar (functionally and/or structurally) features.

DETAILED DESCRIPTION

Figure 1:
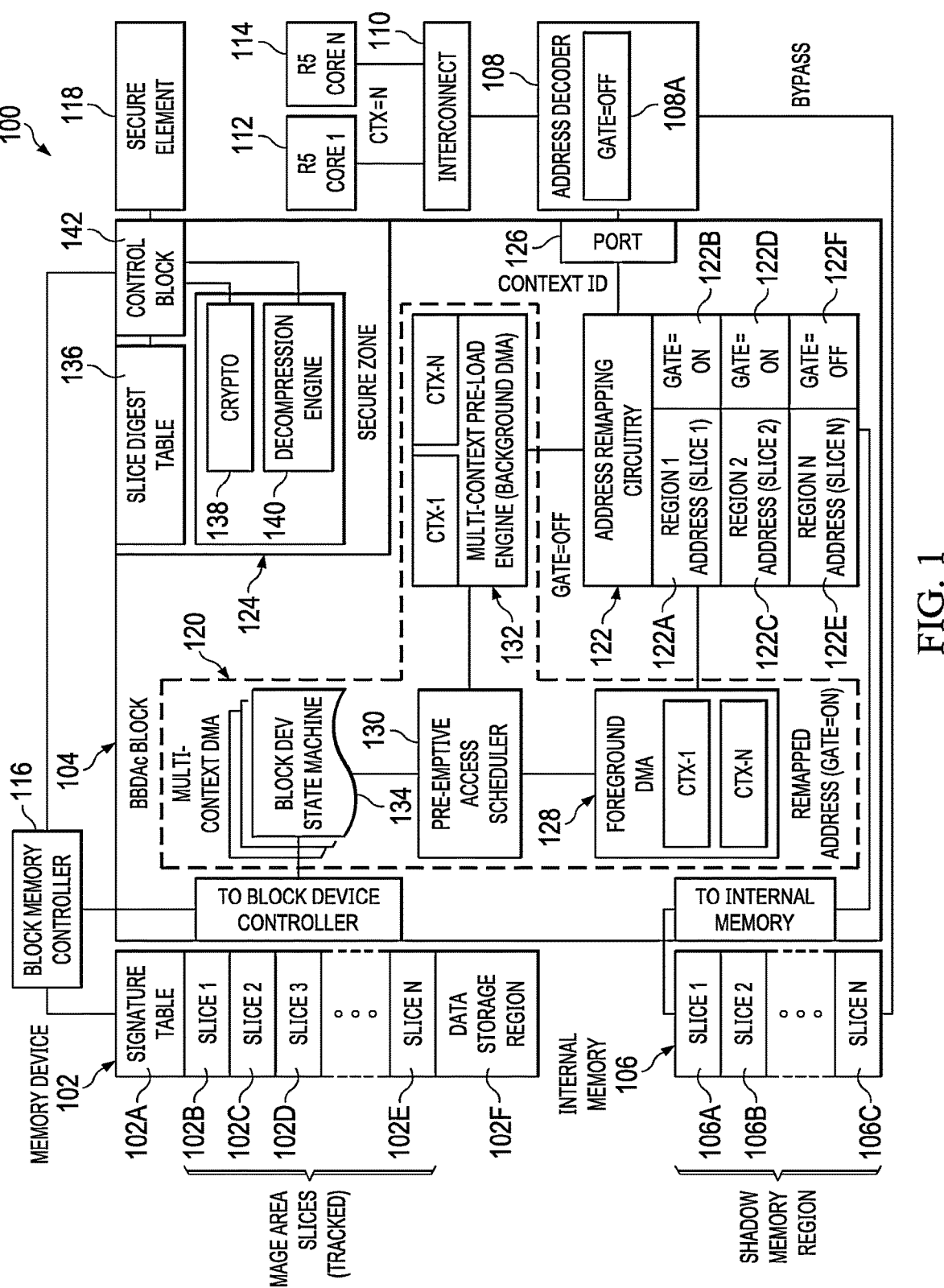
FIG. 1 is a block diagram of an example microcontroller unit configured to boot from an example block device using an example boot from block device accelerator.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Traditional microcontroller units (MCUs) include integrated flash configured as a boot medium for execute in place operations of an application. Traditional MCUs store a boot image within the integrated flash, such that applications requiring secure boot loading may pre-authenticate the boot image to reduce MCU boot duration to bypass authentication of the boot image during MCU boot operations. An MCU may store one or more boot images in external memory in order to reduce the system on chip (SoC) size of the microcontroller. An MCU that is configured to boot from external memory may perform the operation of secure boot loading by authenticating the boot image stored in external memory after the boot image is transferred to internal memory. Some example applications, which require time sensitive startup logic and secure boot, may experience increased boot sequence durations as a result of having to copy the entire boot image, stored in external memory, to internal memory (e.g., random access memory (RAM)) before the MCU may authenticate the boot image.

A multi-core MCU is an MCU including a central processing unit (CPU) including a plurality of compute cores. Such compute cores may be referred to as processing cores, cores, etc. Multi-core MCUs may utilize a separate boot image for each compute core in the multi-core MCU. For example, a CPU including two compute cores may load at least two boot images in order to begin processing operations of an application. Accordingly, multi-core MCUs may incorporate more integrated flash than an MCU including only one compute core to compensate for a plurality of boot images being stored within the flash memory. Some multi-core MCUs are configured to use external devices to store the plurality of boot images, which may be utilized to begin processing operations of an application, in order to decrease the SoC size of the microcontroller and reduce the cost of increasing integrated flash memory.

In such examples, the cost of the multi-core MCU may be further reduced by implementing a block-based flash memory device (e.g., NAND memory, NOR memory, etc.). Block memory devices may be read in blocks comprised of a fixed number of bytes. Block-based flash memory devices are configured to transmit a complete block of memory in response to a read transaction. For example, a NAND memory device may require each read operation to consist of one kilobyte blocks, such that the stored data is supplied in blocks of one kilobyte. In such an example, a device which requests a portion of the data stored in a block of memory may only be able to access the data as a result of requesting a complete read of the block of memory. Block-based flash memory devices are configured to assign stored data to a memory address of the block of data of which the stored data is assigned, such that data stored in a block of a block-based flash memory may be read using the block address. For example, a specific value of an entry in a data table stored at a block at a memory address may be accessed by another device as a result of requesting to read the block associated with the data table. In such an example, the specific value may be determined as a result of using an offset and/or by storing and searching the data table in local memory. Access to data stored in block-based flash memory devices is limited to reading an entire block of memory before and/or while determining a location of the value stored in the block of memory.

Block-based memory devices may be configured to include blocks of any size. Advantageously, a size of a SoC package of a block-based memory device may be reduced as a result of increasing the size of the blocks, such that a block-based memory device may increase memory capacity or decrease the SoC package as a result of increasing the size of the blocks. Advantageously, a cost of the block-based memory device may be reduced as a result of increasing the size of the blocks, such that circuitry associated with accessing an increased number of addressable blocks is reduced. Block-based storage devices may further reduce cost as a result of using a serial interface to access stored data. A number of program and/or erase cycles of a block-based memory device decreases as the size of the blocks are increased. Advantageously, an application of a block-based memory device, which uses a relatively large block size to store one or more boot images, only erases and/or programs blocks of a block device when changes are made to the boot images. Block-based storage devices configured to store data which requires infrequent programming and/or erasing (such as storing boot images) may use relatively large block sizes to decrease size and cost of a system.

A multi-core MCU, which implements a block device as external memory to store one or more boot images, requires additional time during the boot sequence to transfer the boot images from an external storage device to internal memory. Additionally, applications supporting secure boot require additional time to authenticate the images after being transferred to internal memory. In time sensitive applications (e.g., digital clusters), the additional time to transfer the entire boot image from the external storage device to internal memory and/or authenticate the boot image may cause performance issues and/or limit implementations of multi-core MCUs.

Examples disclosed herein include methods and apparatus to boot an MCU using one or more boot images stored in a block storage device, such a block storage device may be external to the MCU. In some described examples, a boot from block device accelerator (BBDAc) may be implemented to reduce the duration of time required to boot an MCU. The BBDAc may be implemented in multi-core MCUs to further reduce the additional time required to boot the multi-core MCU using a plurality of boot images stored on a block storage device. The BBDAc described herein may perform on-the-fly incremental authentication of the boot images as they are loaded into internal memory, such that the BBDAc may be included in applications that require secure boot loading. Advantageously, the BBDAc may implement incremental authentication to enable secure boot loading while transferring portions of the boot image to internal memory.

In some described examples, the BBDAc may transfer portions of the boot image from the external block device to internal memory as a result of receiving commands from a compute core. For example, a compute core may request the BBDAc transfer and authenticate a portion of the boot image in order to perform time sensitive application operations. In such an example, the BBDAc may determine a slice of the image stored in one or more blocks of the block device to load and authenticate based on the request from the compute core. Alternatively, the BBDAc may preprocess portions of the boot images, such that each boot image may have a corresponding preload header, which may be used by the BBDAc to determine a sequence to transfer and authenticate each block of each boot image. Advantageously, the BBDAc reduces the duration of time required to boot an MCU from an external block device as a result of performing on-the-fly incremental authentication and image loading.

FIG. 1 is a block diagram of an example microcontroller unit (MCU) 100 configured to boot from an example memory device 102 using an example boot from block device accelerator (BBDAc) 104. In the example of FIG. 1, the MCU 100 includes the memory device 102, the BBDAc 104, example internal memory 106, an example address decoder 108, an example interconnect 110, a first example compute core 112, a second example compute core 114, an example block memory controller 116, and an example secure element 118. The MCU 100 is configured to boot the compute cores 112 and 114 from one or more boot images stored on the memory device 102. The MCU 100 may implement the BBDAc 104 to load, authenticate, and decompress one or more boot images stored on the memory device 102. The MCU 100 may boot the compute cores 112 and 114 using portions of a boot image that are loaded as a result of the compute cores 112 or 114 requesting access to a portion of the boot image to from the BBDAc 104.

In the example of FIG. 1, the memory device 102 is coupled to the block memory controller 116. Alternatively, the memory device 102 may be coupled to the BBDAc 104. The memory device 102 may be a block memory device (e.g., a NAND device), such that data may only be read in predetermined amounts (e.g., 1 kilobyte, 10 kilobytes, etc.). The memory device 102 is a block memory device which may be represented as a combination of a plurality of different individually addressable blocks of memory, such blocks of memory may be referred to as slices or portions.

In the example of FIG. 1, the memory device 102 is a flash memory device including a region configured to store an example signature table 102A, a region configured to store slices of an image (illustrated as a first example slice 102B, a second example slice 102C, a third example slice 102D, a fourth example slice 102E, etc.), and a further data storage region 102F. The slices 102B-102E each correspond to a different address within the memory device 102. The address of the slice may correspond to an address of the first bit in the slice. Data stored in the memory device 102 may be accessed using a read operation including an address of one or more blocks of the device to be read. For example, the memory device 102 may respond to a read request using communication circuitry (e.g., a serial interface, a serial peripheral interface, etc.) included in the block memory controller 116 between the memory device 102 and the BBDAc 104. Alternatively, the memory device 102 may be accessed using another communication protocol (e.g., inter-integrated circuit (I2C), serial peripheral interface (SPI), asynchronous communications, etc.). Alternatively, the memory device 102 may be an external flash device which is not limited by block access.

The BBDAc 104 is coupled to the internal memory 106, the address decoder 108, the block memory controller 116, and the secure element 118. The BBDAc 104 includes example multi-context direct memory access (DMA) circuitry 120, example address remapping circuitry 122, example secure zone circuitry 124, and an example port 126. The BBDAc 104 is configured to load, authenticate, and/or decompress one or more portions of one or more boot images stored in the memory device 102 based on either an access request generated by the compute cores 112 and/or 114 (such an order may be referred to as a foreground load), an order based on incrementing a linear memory address (such an order may be referred to as a background load), and/or an order defined by a pre-load header table. Such an access request specifies a slice of an image to be transferred. The BBDAc 104 may transfer one or more boot images, a slice (e.g., the slices 102B-102E) at a time, into internal memory 106 using the multi-context DMA circuitry 120. The BBDAc 104 may track which slices of the boot image were transferred to internal memory 106 using the address remapping circuitry 122. The BBDAc 104 may authenticate the slices of the boot image on-the-fly using the secure zone circuitry 124.

The multi-context DMA circuitry 120 is configured to couple the block memory controller 116 to the address remapping circuitry 122. The multi-context DMA circuitry 120 may additionally be coupled to the internal memory 106 and/or the secure zone circuitry 124. The multi-context DMA circuitry is an example direct memory access circuit. In the example of FIG. 1, the multi-context DMA circuitry 120 includes example foreground DMA circuitry 128, example access scheduler circuitry 130, example background DMA circuitry 132, and an example block device state machine 134. The multi-context DMA circuitry 120 enables the address remapping circuitry 122 to send access request to the memory device 102 using a plurality of DMA circuitry (e.g., the DMA circuitry 128 and 132), such that the multi-context DMA circuitry 120 may preload slices of a boot image while fulfilling boot image access requests from the address decoder 108. Such read operations between the multi-context DMA circuitry and the memory device 102 may be referred to as a transaction that specifies an image to be transferred from the memory device 102.

The foreground DMA circuitry 128 is coupled between the address remapping circuitry 122 and the access scheduler circuitry 130. The foreground DMA circuitry 128 provides direct memory access between the address remapping circuitry 122 and the memory device 102. The foreground DMA circuitry 128 may be configured to perform on-the-fly operations to slices being transferred from the memory device 102. For example, the foreground DMA circuitry 128 may authenticate slices of the boot image as they are being transferred from the memory device 102 to internal memory 106 as a result of accessing the secure zone circuitry 124. The foreground DMA circuitry 128 may include circuitry to process operations for each compute core. For example, the foreground DMA circuitry 128 may access a first DMA channel to transfer slices of an image corresponding to the first compute core 112 and a second DMA channel to transfer slices of an image corresponding to the second compute core 114. Advantageously, the foreground DMA circuitry 128 increases the rate at which the slices of memory may be transferred from the memory device 102 to internal memory 106. Advantageously, the foreground DMA circuitry 128 may perform on-the-fly operations to slices being transferred from the memory device 102.

The access scheduler circuitry 130 is coupled to the foreground DMA circuitry 128, the background DMA circuitry 132, and the block device state machine 134. The access scheduler circuitry 130 is configured to control access to the memory device 102 and establishes an order in which an access attempt from the foreground DMA circuitry 128 and/or the background DMA circuitry 132 is to be completed based on either a high or low priority of the transaction. For example, the access scheduler circuitry 130 may prioritize attempts to access slices from in the memory device 102 from the foreground DMA circuitry 128 over requests from the background DMA circuitry 132. In such an example, the access scheduler circuitry 130 may provide access to the memory device 102 to the background DMA circuitry 132 as a result of receiving a low priority access request from the background DMA circuitry 132 and no high priority requests from the foreground DMA circuitry 128. The access scheduler circuitry 130 may include circuitry to queue a plurality of access requests from both of the DMA circuitry 128 and 132. Alternatively, the access scheduler circuitry 130 may be replaced, with slight modifications to the multi-context DMA circuitry 120, with decoder circuitry or similar control circuitry.

The access scheduler circuitry 130 may preempt a request from the foreground DMA circuitry 128 during an operation wherein the background DMA circuitry 132 is loading a slice of a boot image, such that the request from the foreground DMA circuitry 128 is fulfilled prior to completing the loading of the slice by the background DMA circuitry 132. For example, the access scheduler circuitry 130 may prevent the background DMA circuitry 132 from completing a transfer of a slice of an image, which has already begun, as a result of receiving an access request from the foreground DMA circuitry 128. In such an example, the access scheduler circuitry 130 allows the request from the foreground DMA circuitry to be completed before completing the operations of the background DMA circuitry 132, which was prevented from being completed by the access scheduler circuitry 130. The access scheduler circuitry 130 establishes a low priority for a pre-emptive load operation of the received from the background DMA circuitry 132. Advantageously, the access scheduler circuitry 130 enables the address remapping circuitry 122 to preload slices of an image using the background DMA circuitry 132 while leaving the foreground DMA circuitry 128 available to request time sensitive slices of a boot image from the memory device 102.

The background DMA circuitry 132 is coupled between the address remapping circuitry 122 and the access scheduler circuitry 130. The background DMA circuitry 132 transfers slices to the boot image from the memory device 102 based on an order specified by either a preload header corresponding to the boot image or linear memory addresses of the slices, beginning at a start block address, comprising the boot image in the memory device 102. For example, the background DMA circuitry 132 may load a first slice, which is stored at the start block address, corresponding to the first block of the memory device 102 that stores the boot image. In such an example, immediately following loading the first slice, the background DMA circuitry 132 loads a second slice that is stored at a memory address sequentially following the start block address, such that the second slice corresponds to a second block of memory in the memory device 102. The background DMA circuitry 132 alerts the address remapping circuitry 122 that a slice of the boot image has been loaded and/or authenticated successfully, such that the slice is not loaded and/or authenticated more than one time. For example, the background DMA circuitry 132 may assert a value, in the address remapping circuitry 122, corresponding to a slice of a boot image at a memory location, specified by a preload header, in the memory device 102 as a result of loading and/or authenticating the slice. In such an example, the address remapping circuitry 122 may access the slice being requested by the address decoder 108 as a result of determining the gate corresponding to the slice is asserted. The background DMA circuitry 132 is configured similarly to the foreground DMA circuitry 128, unless otherwise specified.

The background DMA circuitry 132 may transfer slices of a boot image from the memory device 102 as a result of requesting access to a specific slice, such that the background DMA circuitry 132 may access a slice by specifying a memory address. The background DMA circuitry 132 may preload slices of a boot image as a part of a preload process wherein slices of a boot image, which may be used to perform time sensitive operations, are loaded prior to starting to process operations of the application, such that the foreground DMA circuitry 128 is prevented from fulfilling access requests from the compute cores 112 and/or 114. For example, the access scheduler circuitry 130 allows the background DMA circuitry 132 to preload slices of the boot image prior to prioritizing access requests from the foreground DMA circuitry 128. The background DMA circuitry 132 may preload slices of a boot image during the durations wherein the foreground DMA circuitry 128 is awaiting an access request from the compute cores 112 and/or 114. For example, the BBDAc 104 may use the background DMA circuitry 132 to load a plurality of slices of a boot image as a result of reading a preload header associated with an image being read and stored in the memory device 102. Alternatively, the BBDAc 104 may include one or more channels of the DMA circuitry 128 and 132 to access portions of the memory device 102. Advantageously, the background DMA circuitry 132 may decrease the time to boot one or more compute cores (e.g., the compute cores 112 and 114) as a result of enabling the BBDAc 104 to preload, authenticate, and/or decompress slices of a boot image.

The block device state machine 134 is coupled between the block memory controller 116 and the access scheduler circuitry 130. The block device state machine 134 may convert a boot image access request from the access scheduler circuitry 130 into a request which may be serviced by the block memory controller 116. For example, the block device state machine 134 may supply the block memory controller 116 with an address corresponding to an access request provided by the access scheduler circuitry 130. The block device state machine 134, with slight modifications, may be configured to convert access requests to a request specific to the type of block device, such that an access request may be converted to a request for a hard disk, raw NAND device, a multimedia card, etc. The block device state machine 134 may perform operations on the data received from the memory device 102, such as decompression, authentication, etc. Alternatively, the block device state machine 134 may be included in the block memory controller 116, access scheduler circuitry 130, etc. Advantageously, the block device state machine 134 may enable the access scheduler circuitry 130 to queue a request from the DMA circuitry 128 and/or 132 while a request is being processed by the memory device 102. Advantageously, the block device state machine 134 may enable a plurality of on-the-fly operations to be performed based on the request from the access scheduler circuitry 130.

The address remapping circuitry 122 is coupled to internal memory 106, the port 126, the foreground DMA circuitry 128, and the background DMA circuitry 132. The address remapping circuitry 122 may be coupled to the memory device 102, the block memory controller 116, the access scheduler circuitry 130, and/or the block device state machine 134. In the example of FIG. 1, the address remapping circuitry 122 includes a first example region address 122A, a first example gate 122B, a second example region address 122C, a second example gate 122D, a third example region address 122E, and a third example gate 122F. The address remapping circuitry 122 may include a plurality of region addresses and/or gates corresponding to the number of slices comprising one or more boot images stored in the memory device 102. The address remapping circuitry 122 may transmit an access request to access a slice of an image corresponding to a region address (e.g., the region addresses 122A, 122C, and 122E) as a result of receiving a request from the port 126 to access a slice of a boot image corresponding to the region address. The address remapping circuitry 122 determines a slice of the boot image associated with an access request, such that the slice containing the requested portion of the boot image may be transferred. For example, the address remapping circuitry 122 may determine a memory address, in the memory device 102, for a slice of a size of 2 kilobytes (KB) which includes a portion of the boot image, approximately 32 bytes, required to fulfill the access request. The address remapping circuitry 122 may access a slice of the internal memory 106 as a result of determining the slice associated with an access request has already been transferred to internal memory 106 from the memory device 102.

The address remapping circuitry 122 includes a plurality of region addresses (e.g., the region addresses 122A, 122C, and 122E) which each correspond to a gate (e.g., the gates 122B, 122D, and 122F) that may be asserted to represent the region being stored in internal memory 106. The address remapping circuitry 122 is configured to track transactions which result in a slice of an image to be transferred from the memory device 102 to internal memory. For example, the address remapping circuitry 122 may indicate to the port 126 that the slice of a boot image being accessed is already in internal memory 106 as a result of determining the gate corresponding to the region address of the slice is asserted. In one such example, the address remapping circuitry 122 may request the slice of the boot image to be transferred from the memory device 102 using the foreground DMA circuitry 128 as a result of determining the gate associated with the region address of the slice is not asserted. Gates of the address remapping circuitry 122 may be asserted by the background DMA circuitry 132 as slices of an image are preloaded. For example, the background DMA circuitry 132 asserts gates corresponding to slices that have been pre-loaded. Alternatively, the address remapping circuitry 122 may load a slice from internal memory 106 as a result of determining the gate associated with the slice is asserted. Advantageously, the address remapping circuitry 122 tracks which slices of a boot image have been transferred to internal memory 106. Advantageously, the address remapping circuitry 122 may send time sensitive access requests to the memory device 102 using the foreground DMA circuitry 128 and may preload slices of an image using the background DMA circuitry 132.

The secure zone circuitry 124 is coupled to the secure element 118. In the example of FIG. 1, the secure zone circuitry 124 includes an example slice digest table 136, example cryptography circuitry 138, example decompression engine circuitry 140, and example control block circuitry 142. The secure zone circuitry 124 performs processes to authenticate, decompress, and/or locate slices of a boot image being transferred from the memory device 102. The secure zone circuitry 124 is configured to decompress an image slice using decompression engine circuitry. The secure zone circuitry 124 may be accessed by the secure element 118 to enable additional circuitry to utilize the processes of the secure zone circuitry 124.

The slice digest table 136 is coupled to the control block circuitry 142. Alternatively, the slice digest table 136 may be adapted to be coupled to any component of the MCU 100. The slice digest table 136 is a hardware lookup table, which is loaded as a result of the completion of preprocessing the signature table 102A. The preprocessing of the signature table 102A may be configured to determine a plurality of slices comprising the memory device 102 and/or pointers associated with the slices, such that the slice digest table 136 may authenticate slices of a boot image on-the-fly. The slice digest table 136 may enable the BBDAc 104 to perform on-the-fly decompression and authentication of slices of a boot image. For example, the slice digest table 136 may store slice digest data specific to each slice of the memory device 102 which may be needed in order to authenticate and/or decompress the corresponding slice of the boot image. In such an example, the slice digest table 136 may include a verified digital signature for each slice which may be compared to a slice to authenticate the slice to support secure boot loading. Advantageously, the slice digest table 136 decreases the duration of time required to boot the MCU 100 as a result of enabling on-the-fly decompression and/or authentication of slices of a boot image. Advantageously, the slice digest table 136 enables the BBDAc 104 to support secure boot loading while loading a boot image one slice at a time.

The cryptography circuitry 138 is coupled to the control block circuitry 142. Alternatively, the cryptography circuitry 138 may be coupled to another component of the BBDAc 104 as a result of additional hardware encryption requirements of an application of the MCU 100. The cryptography circuitry 138 may be configured by the secure element 118. For example, the secure element 118 may provide encryption keys and/or secure identifiers to the cryptography circuitry 138. The cryptography circuitry 138 may authenticate slices of a boot image as a result of determining whether a valid digital signature is associated with a slice of the boot image. For example, the cryptography circuitry 138 may access portions of the slice digest table 136 to determine whether a digital signature associated with a slice of the boot image meets the criteria required for secure boot of the MCU 100 using the boot image stored in the memory device 102. The cryptography circuitry 138 may encrypt and/or decrypt portions of the boot image. For example, an example secure operation of the compute cores 112 and 114 may be encrypted by the cryptography circuitry 138 before being stored in internal memory 106, such that the operation may not be accessed. In some such examples, the cryptography circuitry 138 may decrypt the encrypted portion of the boot image prior to the operation being accessed by the compute cores 112 or 114. Advantageously, the cryptography circuitry 138 enables slices of the boot image stored in the memory device 102 to support secure boot operations as a result of digital signature verification and/or referencing the slice digest table 136. Advantageously, portions of the boot image may be encrypted, prior to being stored in the internal memory 106.

The decompression engine circuitry 140 is coupled to control block circuitry 142. The decompression engine circuitry 140 may be coupled to another component of the BBDAc 104 as a result of additional data compression requirements of an application of the MCU 100. The decompression engine circuitry 140 may be configured by the secure element 118. For example, the secure element 118 may provide data specific to the compression of the data to be decompressed to the decompression engine circuitry 140. The decompression engine circuitry 140 may decompress a slice of a boot image prior to the slice being stored in internal memory 106. For example, the slices of a boot image may be larger than a slice of memory comprising the memory device 102 as a result of the data stored in the slice of the memory device 102 being compressed to approximately be the size of a slice of the memory device 102. Advantageously, the compressed size of the slice is transferred from the memory device 102 using the block memory controller 116, while the decompressed size of the slice is transferred to internal memory 106 using the DMA circuitry 128 and 132. The decompression engine circuitry 140 enables on-the-fly decompression of the slices of the image using decompression engine circuitry as a slice is transferred from the memory device 102. The decompression engine circuitry 140 may decompress data stored in internal memory 106. For example, a large data may be decompressed by the decompression engine circuitry 140 as a result of the large data set being compressed to limit the use of the internal memory 106. Advantageously, the decompression engine circuitry 140 enables the BBDAc 104 to perform on-the-fly decompression of data being transferred from the memory device 102. Advantageously, the decompression engine circuitry 140 enables the slices of the boot image being stored in a block memory of the memory device 102 to be decompressed to a size larger than that of the size of the block of memory included in the memory device 102.

The control block circuitry 142 is coupled between the block memory controller 116 and the secure zone circuitry 124. The control block circuitry 142 is coupled to the secure element 118. Alternatively, the control block circuitry 142 may be coupled to another component of the MCU 100 based on an application of the BBDAc 104, memory device 102, internal memory 106, etc. The control block circuitry 142 may perform on-the-fly authentication and/or decompression of a slice of memory being transferred from the memory device 102. The control block circuitry 142 may authenticate a slice being transferred from the memory device 102 as a result of using the cryptography circuitry 138 to compare digital signatures and/or pointers within the slice to the slice digest table 136. For example, the control block circuitry 142 may authenticate a slice of a boot image as a result of a comparison of a digital signature from the slice corresponding to a digital signature assigned to an address and/or pointer in the slice digest table 136. Alternatively, the control block circuitry 142 may authenticate a slice of memory from the memory device 102 as a result of determining a valid digital signature and/or matching pointers. The control block circuitry 142 may decompress a slice of memory from the memory device 102 as a result of enabling the decompression engine circuitry 140 to decompress the slice. The control block circuitry 142 may enable the secure element 118 to access the cryptography circuitry 138 and/or the decompression engine circuitry 140. Advantageously, the control block circuitry 142 may enable on-the-fly authentication and/or decompression of a slice of memory from the memory device 102.

The port 126 is coupled between the address decoder 108 and the address remapping circuitry 122. Alternatively, the port 126 may be coupled to a plurality of components configured to access the BBDAc 104. The port 126 is configured as a bi-directional port to enable the address decoder 108 to send access requests for portions of the boot image to be accessed from the memory device 102, which may correspond to one or more specific operations of the compute cores 112 and/or 114, to the address remapping circuitry 122. For example, the address decoder 108 may request the BBDAc 104 to access a portion of the boot image corresponding to a time sensitive operation of the compute cores 112 and/or 114 by sending a request to the port 126 for the portion of the boot image to be loaded. The access request may include a context identifier and/or memory address that indicates which of the compute cores 112 or 114 is requesting access using an access request. The port 126 may send an access indication to the address decoder 108 as a result of determining that the boot image that is attempting to be accessed, has already been transferred to internal memory 106. For example, the access indication may be the port 126 asserting a gate in the address decoder 108, such that the address decoder 108 may bypass the BBDAc 104 when the boot image has been completely loaded. Advantageously, the port 126 enables the BBDAc 104 to communicate with the address decoder 108.

The internal memory 106 is coupled to the BBDAc 104 and the address decoder 108. The internal memory 106 may be coupled to another component of the MCU 100 based on an application of the MCU 100. The internal memory 106 includes a first example slice 106A, a second example slice 106B, and a third example slice 106C. Alternatively, the internal memory 106 may include any number of slices, which may correspond to slices of data transferred from the memory device 102. The internal memory 106 is a volatile memory storage medium which is accessible as a result of reading data at a memory location, such volatile memory may be erased as a result of loss of power to the device or a device reset. The internal memory 106 may be implemented using a cache, a RAM of any type, a register, and/or any other storage device or storage disk in which information is stored for any duration (e.g., for extended time periods, for brief instances, for temporarily buffering, and/or for caching of the information). The internal memory 106 may store slices of a boot image in locations which may be accessed using a corresponding memory address that may be stored in the address remapping circuitry 122. Advantageously, the internal memory 106 may enable slices of a boot image to be accessed based on a memory address. Advantageously, the internal memory 106 may be read in any size increments.

The address decoder 108 is coupled to the internal memory 106 and the port 126. The address decoder 108 includes an example indication gate 108A. The address decoder 108 may request a portion of a boot image to be transferred from the memory device 102 as a result of the interconnect 110 indicating that one of the compute cores 112 or 114 require the operations corresponding to the portion of the image. For example, the address decoder 108 may request a portion of the boot image as a result of the first compute core 112 requiring the portion of the image corresponding to initialization of one or more peripherals. The address decoder 108 may bypass the BBDAc 104 as a result of determining that the indication gate 108A is asserted, such that the address decoder 108 accesses the internal memory 106 to fulfill access requests for portions of the boot image from the compute cores 112 and 114. The BBDAc 104 and/or the address decoder 108 may assert the indication gate 108A as a result of determining that the boot image has been completely loaded into the internal memory 106. For example, the address decoder 108 may access a portion of a boot image in the internal memory 106 as a result of determining that indication gate 108A is indicating that the boot image, corresponding to the request, is completely stored in the internal memory 106. Advantageously, the address decoder 108 may bypass the BBDAc 104 as a result of determining the entire boot image is stored in internal memory 106.

The interconnect 110 is coupled between the address decoder 108 and the compute cores 112 and 114. Alternatively, the interconnect 110 may be coupled to any number of compute cores (e.g., compute cores 112 and 114). The interconnect 110 may control which of the compute cores 112 or 114 may request a portion of an image. The interconnect 110 may indicate to the address decoder 108 and/or BBDAc 104 which of the compute cores 112 or 114 are requesting a portion of a boot image. For example, the memory device 102 contains a first boot image for the first compute core 112 and a second boot image for the second compute core 114, such that any request for access of a portion of the boot image indicates which of the two possible images the request is associated with. In such an example the address decoder 108 may determine which of the compute cores 112 or 114 is requesting an operation of a boot image based on which compute core is coupled to the interconnect 110 input and/or output. Alternatively, the interconnect 110 may be a decoder configured to be controlled by the MCU 100. Advantageously, the interconnect 110 enables multiple compute cores to request portions of a boot image from the BBDAc 104.

The compute cores 112 and 114 are coupled to the interconnect 110. The compute cores 112 and 114 may access operations of an application by generating transactions which request access to a specific slice of an image.

The compute cores 112 and 114 are an example processor core configured to generate transactions based on operations of an application being fulfilled by the processor core. The compute cores 112 and 114 may request access to operations corresponding to a specific portion of an image by indicating to the interconnect 110 an intent to begin operations corresponding to a portion of the image, such an access request may be referred to as a transaction. The compute cores 112 and 114 may perform operations as a result of receiving one or more portions of the image. The compute cores 112 and 114 may request time sensitive portions of an image to be loaded by generating an access request, which requests the portion of the image to be transferred from the memory device 102 using the BBDAc 104. For example, the first compute core 112 may request access to portions of the image corresponding to early digital cluster initiation, such that the MCU 100 may process commands received from other devices in the digital cluster. Advantageously, the compute cores 112 and 114 are able to request operations corresponding to portions of an image without transferring the entire image from the memory device 102 prior to servicing the portion being requested.

The block memory controller 116 is coupled between the memory device 102 and the BBDAc 104. The block memory controller 116 may request access to certain blocks of memory within the memory device 102 based on requests for access from the BBDAc 104. For example, the block memory controller 116 may request access to the first slice 102B as a result of an access request from the BBDAc 104. The block memory controller 116 sends requested data to the BBDAc 104 as a result of an access request for one or more slices of the memory device 102. The block memory controller 116 may communicate with the BBDAc 104 using peripheral circuitry which may be included in the block device state machine 134 or apart of the system on chip of the memory device 102. Alternatively, the block memory controller 116 may interface with the BBDAc 104 using a communication protocol, such as inter-integrated circuit (I2C), serial peripheral interface (SPI), etc. Advantageously, the block memory controller 116 enables the memory device 102 to be a block memory device (e.g., a NAND flash, solid state drive (SSD), etc.).

The secure element 118 is coupled to the secure zone circuitry 124 of the BBDAc 104. The secure element 118 is a trusted entity, which may manage and/or access secure content. The secure element 118 may become a trusted entity as a result of a chain of trust being established. For example, the secure element 118 may configure and/or provision the cryptography circuitry 138 to perform hardware encryption for hash table access to portions of the internal memory 106, corresponding to sensitive data. The secure element 118 may configure the decompression engine circuitry 140 to decompress data stored on the memory device 102 which is separate from the boot image. The secure element 118 may be a peripheral device or embedded security processing core responsible for configuration of and runtime state management of keys used for decompression, encryption, and/or decryption. Advantageously, the secure zone circuitry 124 may be accessed to decompress, encrypt, and/or decrypt data by circuitry not within the BBDAc 104.

In example operation, the MCU 100 may begin to transfer slices of a boot image as a result of determining a boot from reset, such that the internal memory 106 no longer stores the boot image. The BBDAc 104 requests access to the signature table 102A to generate the slice digest table 136 as a result of determining a reset has occurred. The BBDAc 104 may additionally parse a preload header and begin to preemptively transfer portions of the boot image from the memory device 102 using the background DMA circuitry 132. The background DMA circuitry 132 may continue to transfer portions of the boot image from the memory device 102 based on the preload header for a boot image and/or the signature table 102A. The address remapping circuitry 122 tracks which portions of the boot image have been transferred from the memory device 102 by either the foreground DMA circuitry 128 and/or the background DMA circuitry 132 by storing the memory address of the portion in internal memory 106 after being transferred from the memory device 102. Additionally, as portions of the boot image are transferred to internal memory 106, the address remapping circuitry 122 modifies the state of a gate corresponding to the portion that was transferred. For example, the address remapping circuitry 122 may assert the first gate 122B as a result of the portion of the boot image corresponding to the first region address 122A being transferred to internal memory 106.

In example operation, the address remapping circuitry 122 may request a portion of the boot image to be transferred with a high priority by transferring the portion of the image using the foreground DMA circuitry 128. For example, the address remapping circuitry 122 may transfer a portion of the boot image using the foreground DMA circuitry 128 as a result of receiving an access request from the port 126 to access a portion of the boot image, which has yet to be transferred to internal memory 106. In such an example, the access scheduler circuitry 130 prioritizes the access request, indicated by the foreground DMA circuitry 128, over any access request by the background DMA circuitry 132. The block device state machine 134 and block memory controller 116 access slices (e.g., slices 102B-102E) stored in the memory device 102 as a result of access requests from the access scheduler circuitry 130.

In example operation, control block circuitry 142 authenticates each portion of the boot image using the cryptography circuitry 138 to determine whether the portion of the boot image has a digital signature and/or matches data stored in the slice digest table 136. The control block circuitry 142 decompresses the portions of the boot image as they are accessed slice using decompression engine circuitry 140, such that the size of the data being stored in internal memory 106 may not be equal to the size of the slice accessed by the BBDAc 104. The secure zone circuitry 124 may perform on-the-fly operations to slices of the boot image being transferred from the memory device 102. For example, the secure zone circuitry 124 may authenticate and/or decompress a slice of the boot image as the slice is being transferred to internal memory 106. Advantageously, the duration between reset and operations of the compute cores 112 or 114 is decreased as a result of on-the-fly authentication and/or decompression.

In example operation, the address decoder 108 may receive an indication from the interconnect 110 that one of the compute cores 112 or 114 are requesting access to a portion of the boot image corresponding to an operation. The address decoder 108 requests the BBDAc 104 to transfer the portion of the boot image from the memory device 102 as a result of receiving the indication. The address decoder 108 may receive the portion of the boot image from internal memory 106 as a result of the address remapping circuitry 122 determining the gate (e.g., the gates 122B, 122D, 122F) associated with one or more slices comprising the portion of the boot image is asserted. The address remapping circuitry 122 may fulfill an access request by accessing the data in the internal memory 106. The address decoder 108 accesses the portion of the internal memory 106 corresponding to the portion of the boot image as a result of determining the boot image has been completely transferred to internal memory 106. The address decoder 108 asserts a gate corresponding to the boot image (e.g., the indication gate 108A) that may be completely accessed in internal memory 106. The address decoder 108 accesses the portion of the boot image stored in internal memory 106 as the address decoder 108 determines whether or not the boot image corresponding to the portion has been completely transferred. For example, the address decoder 108 may bypass the BBDAc 104 as a result of determining all portions of the boot image are in internal memory 106. Alternatively, the BBDAc 104 may be bypassed by the address decoder 108 as potions of an image are stored in memory.

Figure 2:
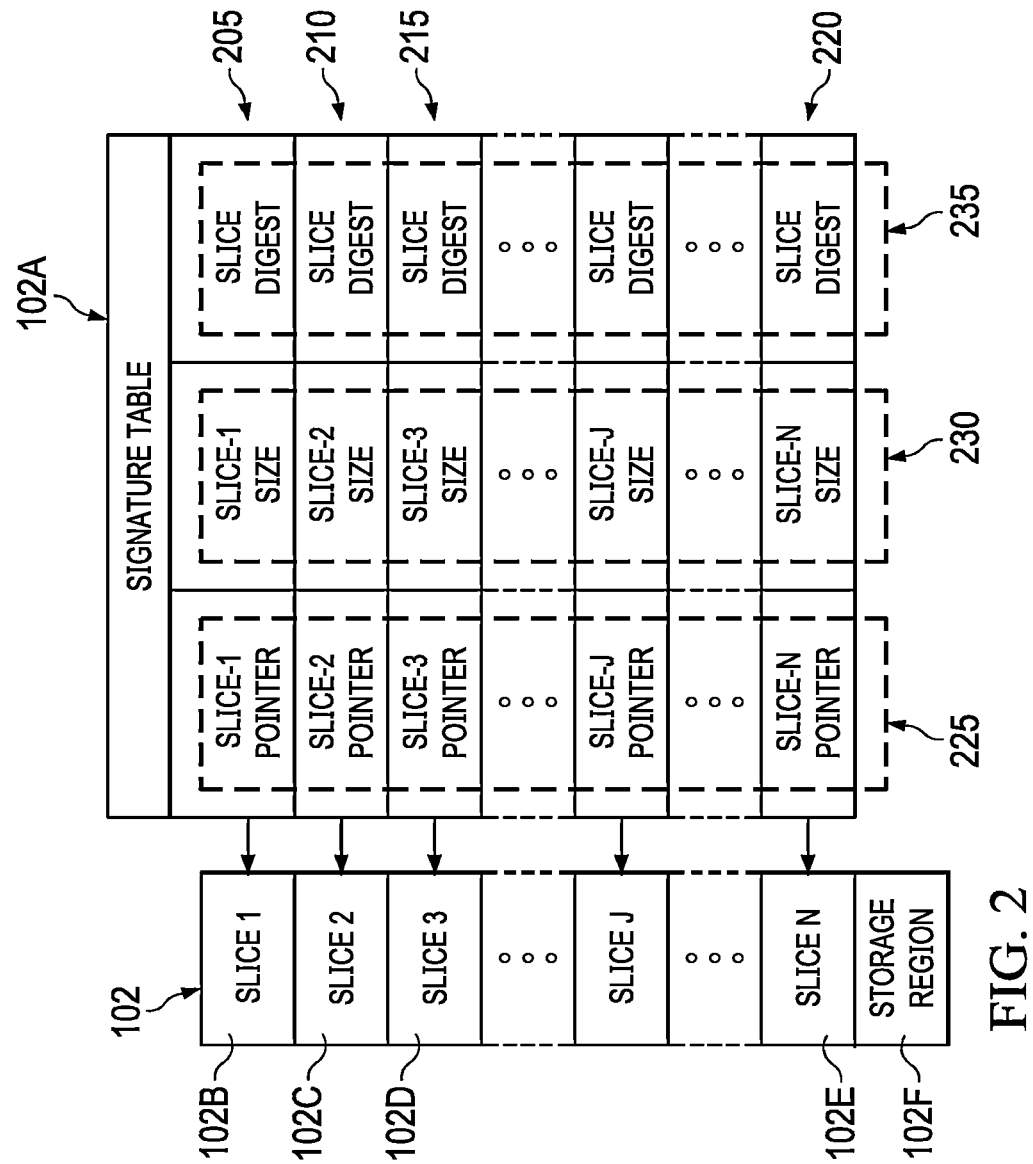
FIG. 2 is an illustrative example of the block device of FIG. 1 including a plurality of compressed portions of an image that may be used to boot the microcontroller unit of FIG. 1.

FIG. 2 is an illustrative example of the memory device 102 of FIG. 1 including a plurality of compressed portions of an image that may be used to boot the MCU 100 of FIG. 1. In the example of FIG. 2, the memory device 102 includes the first slice 102B, the second slice 102C, the third slice 102D, and the storage region 102F. The memory device 102 is a block storage device whose data may only be accessed in portions of a predetermined data size. For example, the memory device 102 may be a NAND flash block device which stores data in blocks of approximately 1 kilobyte. In such an example, the memory device 102 provides data to another device in increments of approximately 1 kilobyte. In the example of FIG. 2, one or more of the blocks comprising the memory device 102 may be referred to as a slice of the boot image, such that a slice of the boot image may include a plurality of the blocks of the memory device 102. Slices of the memory device 102 may be configured to store a portion of a boot image for a MCU (e.g., the MCU 100), such that a plurality of slices may be combined to generate the boot image for one or more compute cores of the MCU. The slice digest table 136 of FIG. 1 is generated using data comprising signature table 102A. The slice digest table 136 maps the slices comprising the memory device 102 to address locations.

In the example of FIG. 2, each of the slices 102B-102E each correspond to a separate row within the signature table 102A and the slice digest table 136. In the example of FIG. 2, the signature table 102A includes a first example row 205, a second example row 210, a third example row 215, and a fourth example row 220. The signature table 102A and slice digest table 136 may include a plurality of rows corresponding to each of the slices of the memory device 102. For example, the signature table 102A may include a row for each slice of the memory device 102 that comprise a boot image for the MCU 100.

The rows 205-220 include an example slice pointer 225, an example slice size 230, and an example slice digest 235. The rows 205-220 each correspond to a slice of memory in the memory device 102. In the example of FIG. 2, the rows 205-220 represent a portion of a boot image, which may be used by the MCU 100 to determine operations of the compute cores 112 and 114 of FIG. 1. For example, the first slice 102B may correspond to the first row 205, such that operations performed using the first slice 102B of a boot image may be called on by accessing the first row 205 of the slice digest table 136. During the operation of the MCU 100, the BBDAc 104 may determine the location of a slice corresponding to an operation of the image by determining which row in the slice digest table 136 represents the slice. Advantageously, each of the rows 205-220 include the data required to access the corresponding slice in the memory device 102.

The slice pointer 225 may be a value representing the location of the slice in the memory device 102. For example, the slice pointer 225 corresponding to the first row 205 is a memory address corresponding to a logical block of the memory device 102 of which the first slice 102B is stored. Advantageously, the slice pointer 225 represents the location of the start of a slice of the boot image.

The slice size 230 may be a value representing the size of the corresponding slice in the memory device 102. For example, the slice size 230 of the first row 205 corresponds to the number of bytes comprising the first slice 102B of the boot image. Alternatively, the slice size 230 may be a value representing the number of blocks within the memory device 102 comprising the first slice 102B. For example, the first slice 102B may span three 1 kilobyte blocks of memory within a NAND flash with 1 kilobyte blocks. In such an example, the slice size 230 may be three to indicate that the first slice 102B includes three blocks of the 1 kilobyte NAND flash. Advantageously, the slice size 230 indicates the number of sequential blocks of the memory device 102 that represent the corresponding slice.

The slice digest 235 may be one or more values corresponding to a slice of a boot image stored in a block of the memory device 102. The slice digest 235 may include values used to authenticate the corresponding slice of the boot image. For example, the slice digest 235 of the first row 205 includes data to authenticate a digital signature of the first slice 102B of the boot image. In such an example, the slice digest 235 enables the secure zone circuitry 124 to authenticate each slice individually. Alternatively, the slice digest 235 may include a value which may be used to decompress the slice of the memory device 102. For example, the slice digest 235 of the first row 205 may include a hash key which may be used by the decompression engine circuitry 140 to decompress the first slice 102B. The slice digest 235 may include data to indicate an operation of the slice and/or a number identification of the slice. Advantageously, the slice digest 235 may be configured to include a plurality of values which may be used by the secure zone circuitry 124 to identify, authenticate, and/or decompress a slice of the boot image.

The slice digest table 136 may be generated as a result of preprocessing the signature table 102A corresponding to the memory device 102. The slice digest table 136 may be constructed by the BBDAc 104 using the signature table 102A. For example, the block device state machine 134 of FIG. 1 may be configured to parse the data stored in the signature table 102A to generate the slice digest table 136. The signature table 102A may be stored in at a fixed memory address in the memory device 102, such that the BBDAc 104 may load the signature table as a result of determining the memory device 102 being coupled to the BBDAc 104. Advantageously, the slice digest table 136 may be modified as a result of modifying the signature table 102A stored with the one or more boot images in the memory device 102.

Figure 3:
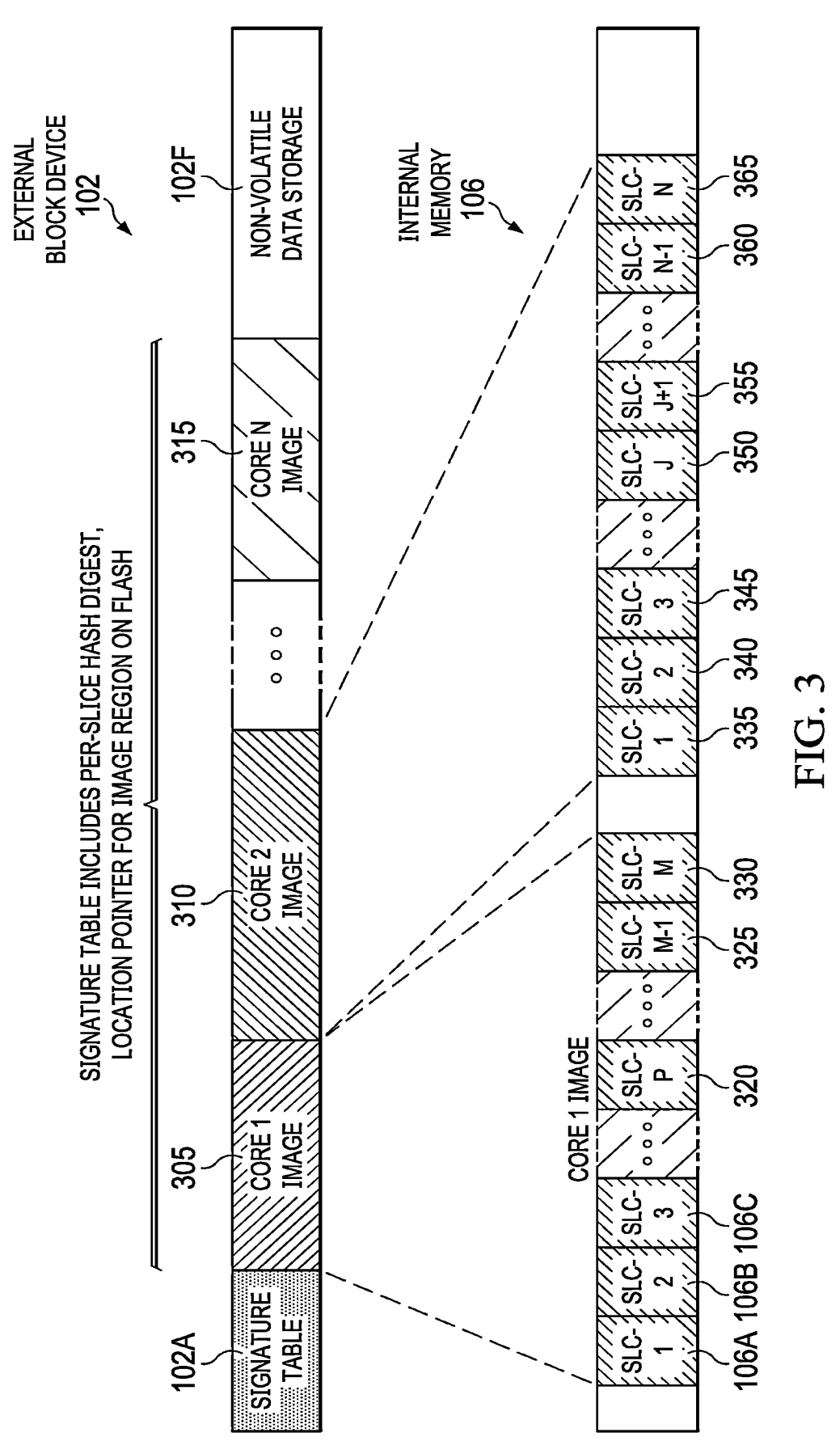
FIG. 3 is illustrative examples of an example memory map of the block device of FIGS. 1 and 2 and its corresponding mapping to internal memory of the microcontroller unit of FIG. 1 including a first example image and a second example image.

FIG. 3 is illustrative examples of an example memory map usage of the memory device 102 of FIGS. 1 and 2 and internal memory 106 by the microcontroller unit of FIG. 1 including a first example image 305 and a second example image 310. In the example of FIG. 3, the memory device 102 includes the storage region 102F of FIGS. 1 and 2, the first image 305, the second image 310, and a third example image 315. The memory device 102 may be coupled to a multi-core MCU (e.g., the MCU 100 of FIG. 1) to boot a plurality of compute cores (e.g., the compute cores 112 and 114 of FIG. 1). For example, the first image 305 may be used to boot a first compute core, while the images 310 and 315 are used to boot a second and third compute core.

The signature table 102A includes a plurality of values which may be processed by the BBDAc 104 to generate the slice digest table 136 of FIGS. 1 and 2. The signature table 102A may include a per-slice hash digest and locations of pointers for each image stored on the memory device 102. For example, the signature table 102A may include the first address of the bit of an image which may be used to run operations on the compute cores 112 and 114 and a total size of the image. Advantageously, the BBDAc 104 may determine the location of each slice of a boot image, stored on the memory device 102, based on the signature table 102A. Advantageously, the BBDAc 104 may use the signature table 102A to populate the slice digest table 136 of FIG. 1.

The images 305-315 include a plurality of slices (e.g., the slices 102B-102E of FIGS. 1 and 2) which comprise a boot image. The images 305, 310, and 315 each correspond to a different compute core within an MCU, such that each compute core in a multi-core MCU may processes operations specific to the core. For example, the first image 305 may correspond to the first compute core 112, such that the first image 305 represents the operations of the first compute core 112. In such an example, the second image 310 may correspond to the second compute core 114, such that the second image 310 represents the operations of the second compute core 114.

In the example of FIG. 3, the images 305 and 310 are stored in the internal memory 106. In the example of FIG. 3, the internal memory 106 includes the first slice 106A, the second slice 106B, the third slice 106C, a fourth example slice 320, a fifth example slice 325, a sixth example slice 330, a seventh example slice 335, an eighth example slice 340, a ninth example slice 345, a tenth example slice 350, an eleventh example slice 355, a twelfth example slice 360, and a thirteenth example slice 365. The internal memory 106 illustrates the internal memory 106 after the slices of the image 305 and 310 have been transferred from the memory device 102 by the BBDAc 104.

The first image 305 corresponds to the slices 106A-106C and 320-330. The slices 106A-106C and 320-330 each represent a portion of the first image 305, such that each of the slices 106A-106C and 320-330 may represent one or more operations of the first compute core 112. For example, the slices 106A, 106B, and 320 may be transferred to internal memory 106 as a result of the first compute core 112 requesting access to the operations of the first slice 106A and/or a preload operation, such as background load (described above). The sixth slice 330 (SLC-M) represents the last slice of the first image 305, such that there are M number of slices. The fourth slice 320 (SLC-P) represents a slice number corresponding to the fourth slice 320, such that P may be a number between one and the M number of slices. The slices 106A-106C and 320-330 may be transferred to internal memory 106 as a result of the first compute core 112 requesting access to the operations or using the background DMA circuitry 132 of FIG. 1 to transfer each slice based on the signature table 102A and/or slice digest table 136 of FIGS. 1 and 2.

The second image 310 corresponds to the slices 335-365. The second image 310 is transferred and stored in internal memory 106 similar to the slices 106A-106C and 320-330, unless otherwise stated. The slices 335-365 represent operations of the second compute core 114 of FIG. 1. Advantageously, the images 305-315 may be placed in the internal memory 106 based on the BBDAc 104.

Figure 4:
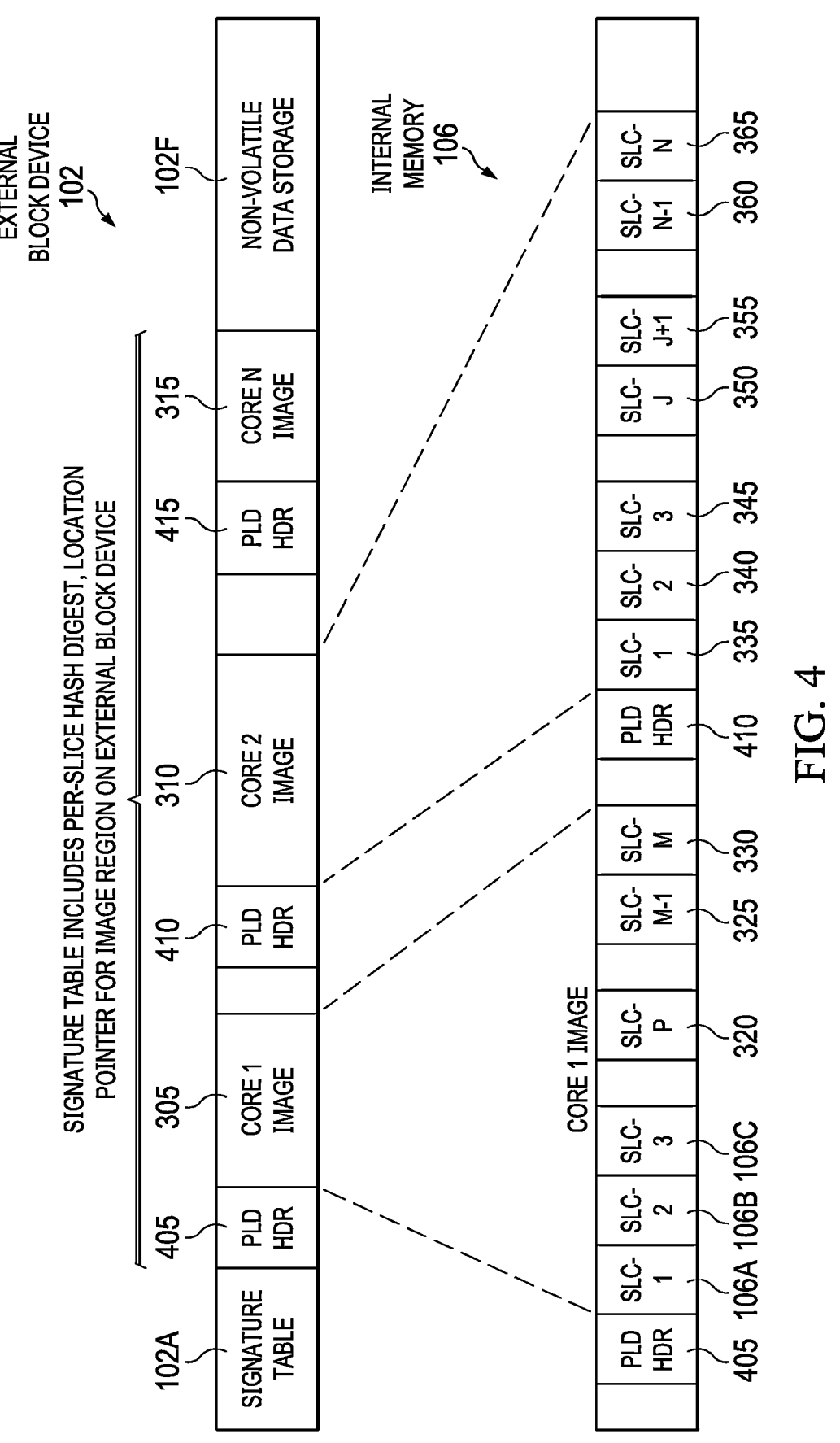
FIG. 4 is illustrative examples of an example memory map of the block device of FIGS. 1 and 2 and internal memory of the microcontroller unit of FIG. 1 including the first image of FIG. 3, the second image of FIG. 3, and example preload headers.

FIG. 4 is an illustrative example of an example memory usage of the memory device 102 of FIGS. 1 and 2 and internal memory 106 of FIG. 1 by the MCU 100 of FIG. 1 including the first image 305 of FIG. 3, the second image 310 of FIG. 3, and example preload headers 405-415. In the example of FIG. 4, the memory usage of the memory device 102 includes the signature table 102A of FIGS. 1 and 2, the storage region 102F of FIGS. 1-3, the first image 305 of FIG. 3, the second image 310 of FIG. 3, the third image 315, a first example preload header 405, a second example preload header 410, and a third example preload header 415. The memory device 102 may include a plurality of preload headers corresponding to the number of images stored in the memory device 102, such that each image corresponds to a preload header. In the example of FIG. 4, the memory usage of the memory device 102 is similar to the memory usage the memory device 102 of FIG. 3, unless otherwise stated.

The preload headers 405-415 each correspond to a separate image stored on the memory device 102. For example, the first preload header 405 corresponds to the first image 305. The preload headers 405-415 include data to enable the background DMA circuitry 132 of FIG. 1 to preload slices of a boot image. For example, the first preload header 405 may determine an order in which the slices 106A-106C and 320-330 comprising the first image 305 are to be preloaded by the background DMA circuitry 132. In such an example, the background DMA circuitry 132 transfers slices of the boot image from the memory device 102 based on an order specified by the first preload header 405. The preload headers 405-415 may be transferred to the internal memory 106, such that the BBDAc 104 may determine which slice to load based on a location in internal memory 106. Alternatively, the preload headers 405-415 may include data specific to one or more slices of the corresponding image which may enable the BBDAc 104 to determine a method of preloading slices of the image based on operations corresponding to the slices. Advantageously, the time between reset and operations of the MCU 100 is reduced as a result of preloading slices of the boot image using the preload headers 405-415.

Figure 5:
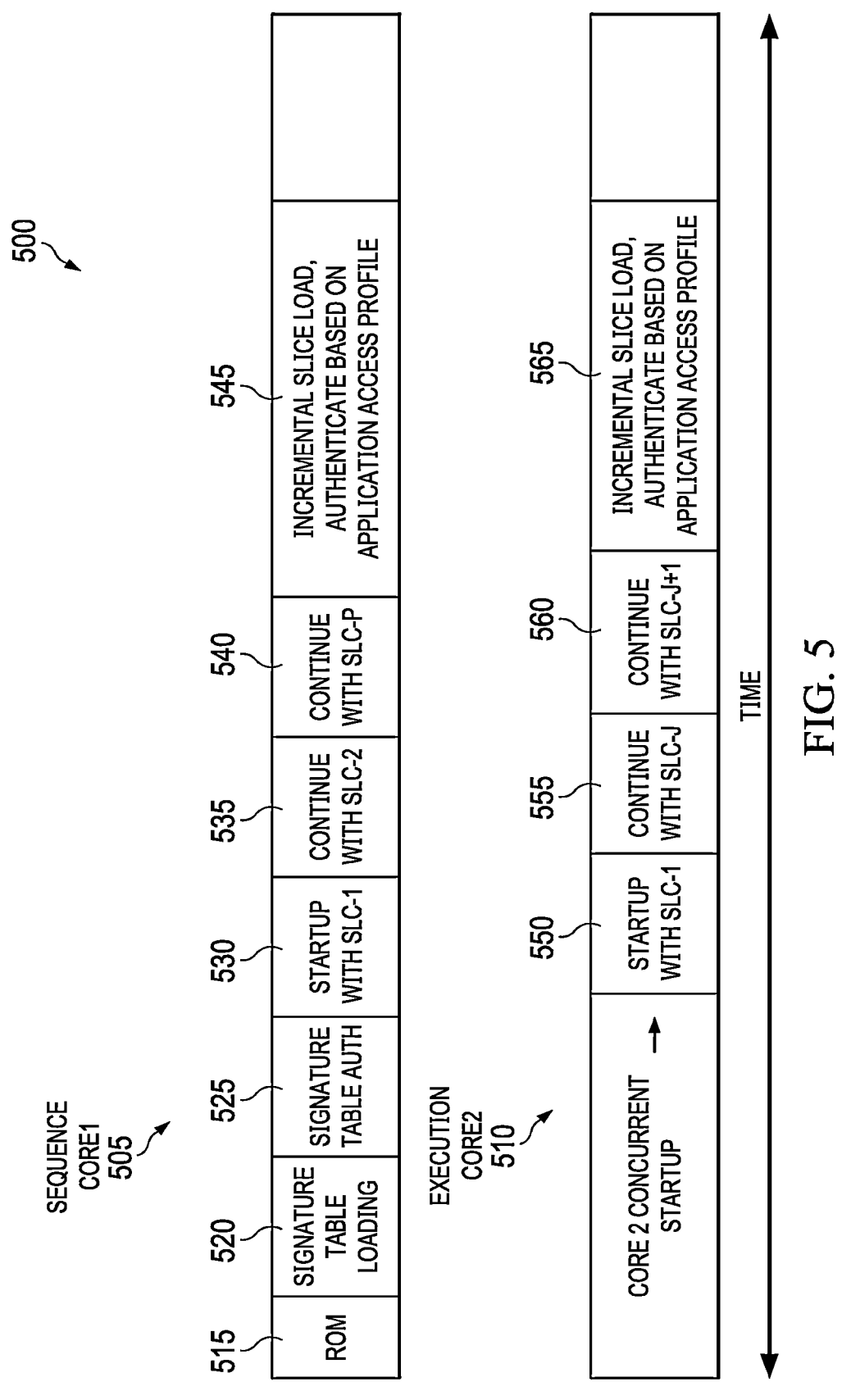
FIG. 5 is an example timing diagram of an example sequence to boot the microcontroller unit of FIG. 1 using the boot from block device accelerator of FIG. 1 to boot the first image and the second image of FIGS. 3 and 4 corresponding to an example first and second compute core.

FIG. 5 is an example timing diagram 500 of an example sequence to boot the MCU 100 of FIG. 1 using the BBDAc 104 of FIG. 1 to boot the first image 305 and the second image 310 of FIGS. 3 and 4. In the example of FIG. 5, the timing diagram 500 illustrates a first example compute core boot sequence 505 and a second example compute core boot sequence 510. The timing diagram 500 illustrates an example boot sequence for the MCU 100.

In the example of FIG. 5, the first compute core boot sequence 505 includes an example read only memory (ROM) operation 515, an example signature table loading operation 520, an example signature table authentication operation 525, a first example slice operation (SLC-1) 530, a second example slice operation (SLC-2) 535, a third example slice operation (SLC-P) 540, and a first example incremental load operation 545. The first compute core boot sequence 505 illustrates the operation which may be performed by the MCU 100 to boot the first compute core 112 of FIG. 1. The first compute core boot sequence 505 illustrates a sequence of operations which may be performed by the MCU 100 as a result of a reset state, wherein the first image 305 is stored on the memory device 102 of FIG. 1.

The first compute core boot sequence 505 may begin with the ROM operation 515. The ROM operation 515 is an illustrative representation of an initialization of any ROM included in an example MCU. The ROM operation 515 may include allocating enough memory to store one or more boot images. For example, the MCU 100 may allocate enough memory in ROM to store one or more of the boot images required to initialize a core. In such an example, the MCU 100 may determine the amount of memory to allocate as a result of loading the signature table 102A. The ROM of the ROM operation 515 may be referred to as flash memory or internal memory 106. The ROM operation 515 may enable the MCU 100 to access a boot image stored in internal non-volatile memory.

The ROM operation 515 may be proceeded by the signature table loading operation 520. The signature table loading operation 520 is a series of operations performed by the BBDAc 104 of FIG. 1 to transfer the signature table 102A from the memory device 102 to the internal memory 106 of FIG. 1. The BBDAc 104 may decompress the signature table 102A using the decompression engine circuitry 140 of FIG. 1. Advantageously, the transfer of the signature table 102A to internal memory 106 enables the BBDAc 104 to authenticate the signature table 102A.

The signature table loading operation 520 is proceeded by the signature table authentication operation 525. The signature table authentication operation 525 is a series of operations performed by the BBDAc 104 to authenticate the signature table 102A. The signature table authentication operation 525 may be performed using the cryptography circuitry 138 of FIG. 1. For example, the cryptography circuitry 138 may authenticate the signature table 102A by determining whether the signature table 102A includes a valid digital signature and/or valid pointers to slices of a boot image stored in the memory device 102. In such an example, the BBDAc 104 may generate the slice digest table 136 of FIG. 1 as a result of authenticating the signature table 102A. Alternatively, the BBDAc 104 may generate the slice digest table 136 as the signature table authentication operation 525 is being performed. Advantageously, the signature table authentication operation 525 enables the MCU 100 to support secure boot operations.

The signature table authentication operation 525 is proceeded by the slice operations 530-540. The slice operations 530-540 represent both the series of operations that the BBDAc 104 performs to transfer a slice of the boot image (e.g., the slices 102B-E of FIGS. 1 and 2) from the memory device 102 and an execution of the operations of the slice by the first compute core 112 of the MCU 100. For example, the first slice operation 530 may represent the operations of the BBDAc 104 to configure the background DMA circuitry 132 of FIG. 1 to transfer the first slice 102B into internal memory 106. In such an example, the operations of authenticating and/or decompressing the first slice 102B by the secure zone circuitry 124 of FIG. 1 may be included in the first slice operation 530. The slice operations 530-540 may be performed by either the foreground DMA circuitry 128 of FIG. 1 or the background DMA circuitry 132 based on whether the slice operation was initiated by a compute core (e.g., the compute cores 112 and 114) or by a sequence established by a preload header (e.g., the preload headers 405, 410, and/or 415 of FIG. 4). Advantageously, the slice operations 530-540 enable the operations represented by a slice to be performed by a compute core while loading another slice of the boot image.

The slice operations 530-540 are proceeded by the first incremental load operation 545. The first incremental load operation 545 includes one or more slice operations (e.g., the slice operations 530-540) based on the size of a boot image corresponding to the compute core being booted. For example, the first incremental load operation 545 may be the operations of the BBDAc 104 to load, authenticate, and/or decompress one or more slices of the boot image which remain after the completion of the slice operations 530-540. In such an example, the order in which the slices are to be transferred by the BBDAc 104 may be determined based on the first preload header 405 and/or the first compute core 112.

The incremental load operation 545 includes an authentication of the slices being transferred based on an application access profile, such that images are authenticated by characteristics of the slice in regard to the application. For example, the BBDAc 104 may authenticate a slice, which was requested by the first compute core 112, using application specific pointer data stored in the slice digest table 136 of FIG. 1. In such an example, the slice may be authenticated as a result of determining the access request corresponding to the slice was generated as a result of a previously executed slice of the boot image calling a pointer to the slice being requested. The order of operations of the first incremental load operation 545 may be modified as a result of an access request from the compute core.

The second compute core boot sequence 510 includes a fourth example slice operation 550, a fifth example slice operation 555, a sixth example slice operation 560, and a second example incremental load operation 565. The second compute core boot sequence 510 is configured similar to the first compute core boot sequence 505, unless otherwise stated. The second compute core boot sequence 510 is an example sequence of operations that may be performed by the BBDAc 104 to boot the second compute core 114 of FIG. 1. The second compute core boot sequence 510 begins with the fourth slice operation 550 as a result of the ROM operation 515 and signature table operations 520 and 525 already having been performed as a part of the first compute core boot sequence 505.

The slice operations 550-560 are configured similar to the slice operations 530-540 of the first compute core boot sequence 505, unless otherwise stated. The slice operations 550-560 illustrate the operations of the BBDAc 104 which may be performed to transfer, authenticate, and/or decompress slices of the second image 310. The slice operations 550-560 may be performed at approximately the same time based as a result of configuring the DMA circuitry 128 and 132 to request slices at approximately the same time.

The slice operations 550-560 are proceeded by the second incremental load operation 565. The second incremental load operation 565 is configured similar to the first incremental load operation 545, unless otherwise stated. The second incremental load operation 565 represents the operations of the BBDAc 104 to incrementally transfer, authenticate, and/or decompress slices of the boot image corresponding to the second compute core 114. Advantageously, a plurality of boot sequences (e.g., the core boot sequences 505 and 510) may occur concurrently to startup a multi-core MCU, such that the duration of time to boot the multi-core MCU (e.g., the MCU 100) is reduced.

FIG. 6 is a flowchart representative of an example process that may be performed using machine readable instructions that can be executed and/or hardware configured to implement the BBDAc 104 of FIG. 1, and/or, more generally, to generate the signature table 102A of FIGS. 1-3 and/or the preload headers 405-415 of FIG. 4. The process begins at block 605. At block 605, processer circuitry generates a slice digest for each slice comprising an image region. For example, the slice digest 235 of FIG. 2 may be generated for slices of a boot image, based on operations to be performed by the MCU 100 in response to processing operations based on the boot image. In such an example, the image flash region is the portion of the memory device 102 of FIG. 1 that stores the boot image. The process proceeds to block 610.

At block 610, the processor circuitry generates a signature table including a digital signature. The signature table, generated at block 610, may be authenticated by the BBDAc 104. The signature table, generated at block 610, may include authentication information for each slice of the image region. For example, the signature table 102A is generated to hold a digital signature (e.g., a hash) for each slice comprising the image region of block 605. In such an example, the signature table 102A is signed using a digital certificate to enable the BBDAc 104 of FIG. 1 to authenticate the signature table 102A before loading data into the slice digest table 136 of FIG. 1. Advantageously, the digital signature enables the BBDAc 104 to authenticate the signature table 102A and/or the slices 102B-102E of the boot image. The process proceeds to block 615.

At block 615, the processor circuitry stores the signature table to a location in external flash. For example, the signature table 102A may be stored on the memory device 102 prior to storing the boot image, such that the signature table 102A is located at a memory address sequentially before the boot image. Advantageously, the location set at block 615 enables the BBDAc 104 to locate the signature table 102A in the memory device 102. The process proceeds to block 615.

At block 620, the processor circuitry generates a preload header table for each image in the image flash region. For example, the image region may be parsed by processor circuitry to generate the preload headers 405-415, such that the preload headers 405-415 include data specific to the critical startup operations of the corresponding boot image. In such an example, the preload headers 405-415 are stored in the memory device 102 at a memory address which is sequentially before the images 305, 310, and/or 315, such that the preload header corresponding to each boot image is immediately before the boot image. Advantageously, the generated preload headers may be used to enable the background DMA circuitry 132 of FIG. 1 to preload portions of the boot image stored on the memory device 102. The process proceeds to block 625.

At block 625, the processor circuitry stores a corresponding image and preload header to a location in the image flash region. For example, the first preload header 405 may be located within the memory device 102 memory prior to the first image 305 of FIGS. 3 and 4. Advantageously, the preload headers 405-415 may be located sequentially before the boot image in the memory device 102. The process proceeds to end.

Although example methods are described with reference to the flowchart illustrated in FIG. 6, many other methods of generating a signature table and/or preload headers may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

FIG. 7 is a flowchart representative of an example process that may be performed using machine readable instructions that can be executed and/or hardware configured to implement the BBDAc 104 of FIG. 1, and/or, more generally, to start the BBDAc 104 after a reset of the MCU 100 of FIG. 1. The MCU 100 starts at block 705. At block 705, the MCU 100 determines if a complete image is in internal memory. For example, the address decoder 108 of FIG. 1 may determine if the entire boot image has been loaded to internal memory 106 based on the state of the indication gate 108A of FIG. 1. The MCU 100 proceeds to end the process as a result of determining that there is a complete image stored in internal memory 106. The MCU 100 proceeds to block 710 as a result of determining no image is being completely stored in the internal memory 106.

At block 710, the MCU 100 authenticates a signature table from flash memory. For example, the secure zone circuitry 124 of FIG. 1 may authenticate the signature table 102A of FIG. 1 as a result of determining the presence of a valid digital signature. Advantageously, the authentication of the signature table 102A enables the MCU 100 to boot the compute cores 112 and 114 using the specifications of a secure boot operation. The MCU 100 proceeds to block 715.

At block 715, the MCU 100 loads the signature table and crypto context into a secure zone. For example, the MCU 100 may load the signature table 102A into the secure zone circuitry 124 of FIG. 1, such that access to the signature table 102A is limited to the elements of the secure zone circuitry 124. In such an example, the secure zone circuitry 124 may determine a cryptographic key based on the signature table 102A and/or the secure element 118 of FIG. 1, which may be used by the cryptography circuitry 138 to authenticate slices of one or more boot images corresponding to the signature table 102A. In the example of FIG. 1, the BBDAc 104 may load values from the signature table 102A into the slice digest table 136. The MCU 100 proceeds to block 720.

At block 720, the MCU 100 sets up per-core image loading context. The image loading context involves setting up background DMA circuitry (e.g., the background DMA circuitry 132 of FIG. 1) for each compute core and/or preload engine circuitry (e.g., the address remapping circuitry 122 of FIG. 1), such that an image may be loaded in the background. At block 720, foreground DMA circuitry (e.g., the foreground DMA circuitry 128 of FIG. 1) is configured for each compute core. The DMA circuitry includes one or more DMA channels which are configured to service access requests from multiple compute cores concurrently. Advantageously, the compute cores 112 and 114 may request portions of a boot image to be transferred from the memory device 102. The MCU 100 proceeds to block 725.

At block 725, the MCU 100 starts the BBDAc. For example, the MCU 100 may initiate the BBDAc 104 as a result of enabling the background DMA circuitry 132 to begin preloading slices of the boot images. At block 725, the MCU 100 configures the BBDAc 104 to start without any of the gates 122B, 122D, and 122F of FIG. 1 being asserted to indicate that all of the slices have yet to be loaded into internal memory 106. The process proceeds to end.

Although example methods are described with reference to the flowchart illustrated in FIG. 7 many other methods of initializing the MCU 100 may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 8:
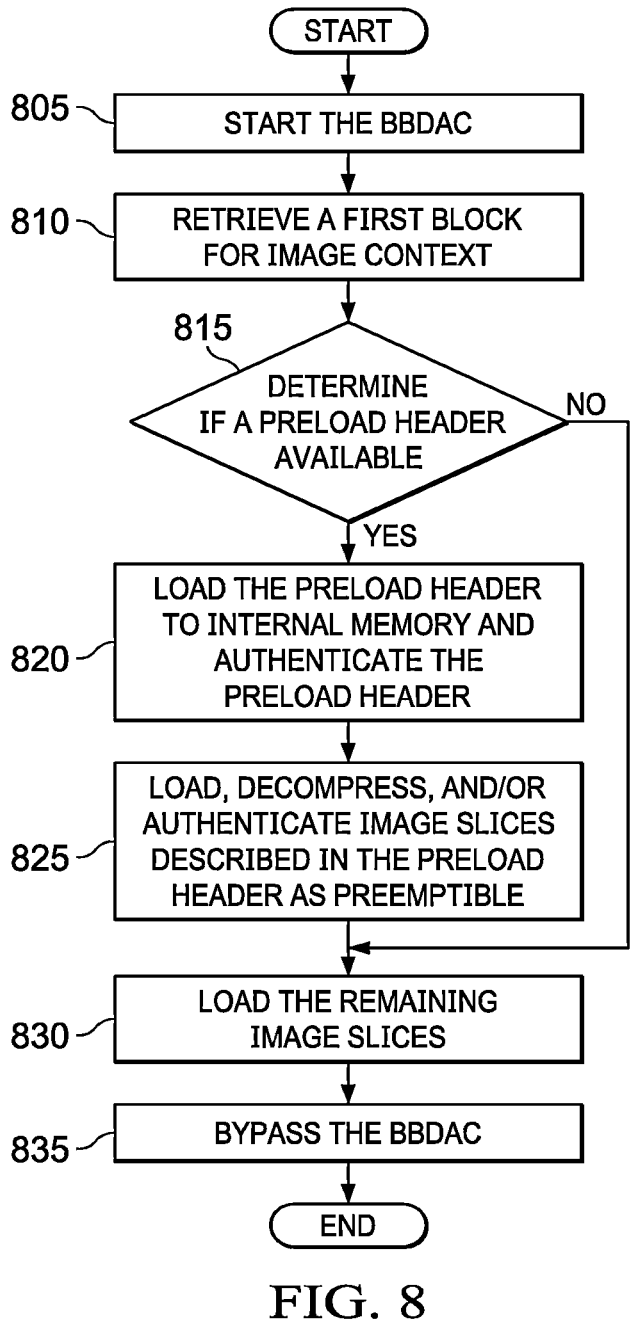
FIG. 8 is a flowchart representative of an example process that may be performed using machine readable instructions that can be executed and/or hardware configured to implement the boot from block device accelerator of FIG. 1, and/or, more generally, to perform the sequence of FIG. 5 to boot the microcontroller unit of FIG. 1 using the preload headers of FIG. 4.

FIG. 8 is a flowchart representative of an example process that may be performed using machine readable instructions that can be executed and/or hardware configured to implement the BBDAc 104 of FIG. 1, and/or, more generally, to perform the sequences 505 and 510 of FIG. 5 to boot the MCU 100 of FIG. 1 using the preload headers 405-415 of FIG. 4. The MCU 100 begins at block 805. At block 805, the MCU 100 starts the BBDAc 104. For example, the MCU 100 may configure the DMA circuitry 128 and 132 of FIG. 1 to allow slices of a boot image to be transferred into internal memory. The MCU 100 proceeds to block 810.

At block 810, the BBDAc 104 retrieves a first block for image context. For example, the BBDAc 104 may transfer the first slice 102B from the memory device 102 as a result of linearly loading slices, one of the preload headers 405-415 or an access request generated by one of the compute cores 112 or 114 of FIG. 1. In such an example, the preload headers 405-415 may be processed by the secure zone circuitry 124 of FIG. 1 to determine which slice to transfer from the memory device 102 first. Advantageously, the first slice transferred from the memory device 102 may cause the corresponding compute core to determine and/or request another slice of the boot image to be transferred as a result of the operations performed based on the first slice. The MCU 100 proceeds to block 815.

At block 815, the BBDAc 104 determines if a preload header is available. For example, the BBDAc 104 may generate an access request to determine whether or not there is a preload header (e.g., the preload headers 405-415) for one or more of the images stored on the memory device 102. In such an example, the access request includes a predetermined location of a preload header which may be sent to the memory device 102 to determine whether or not a preload header is available. Alternatively, the BBDAc 104 may determine whether or not a preload header is available based on signature table 102A of FIGS. 1 and 3. The BBDAc 104 proceeds to block 820 as a result of determining a location of a preload header that is associated with an image. The BBDAc 104 proceeds to block 830 as a result of determining there are no preload headers stored in the memory device 102.

At block 820, the BBDAc 104 loads the preload header to internal memory and authenticates the preload header. For example, the BBDAc 104 may configure the background DMA circuitry 132 of FIG. 1 to transfer the first preload header 405 corresponding to the first image 305 of FIG. 3 into internal memory 106 of FIG. 1. In such an example, the BBDAc 104 may perform on-the-fly authentication of the first preload header 405 using the secure zone circuitry 124 of FIG. 1. Advantageously, the preload header may be accessed in internal memory, such that the preload header does not need to be read from the memory device 102. The BBDAc 104 proceeds to block 825.

At block 825, the BBDAc 104 loads, decompresses, and/or authenticates image slices described in the preload header as preemptible. For example, the BBDAc 104 may configure the background DMA circuitry 132 to preload slices of a boot image based on an order described in the preload header (e.g., the preload headers 405-415). In such an example, the access scheduler circuitry 130 of FIG. 1 may prioritize slice access requests from the foreground DMA circuitry 128 of FIG. 1, such that the order described in the preload header may be compared to the address remapping circuitry 122 of FIG. 1 to determine whether a slice has been transferred. The BBDAc 104 may preempt at a sub-slice boundary as a result of an access request of higher priority is received by the access scheduler circuitry 130 of FIG. 1. For example, the access scheduler circuitry 130 may halt the preloading operation of a multi-block slice being performed by the background DMA circuitry 132 on a block boundary as a result of receiving a high priority access request from the foreground DMA circuitry 128. In such an example, the access scheduler circuitry 130 halts accessing further blocks of a slice of an image which is comprised of a plurality of blocks, such that the sub-slice boundary corresponds to a boundary of a block comprising the memory device 102.

Advantageously, the BBDAc 104 may completely transfer one or more boot images without requiring the compute cores 112 and/or 114 to access each slice of an image. Advantageously, the BBDAc 104 may only transfer critical portions of one or more boot images without requiring the compute cores 112 and/or 114 to access each slice of an image, such that time sensitive operations may be performed prior to loading the complete image. Advantageously, the background DMA circuitry 132 may preload slices of an image as the foreground DMA circuitry 128 awaits a request from the compute cores 112 and/or 114. The BBDAc 104 proceeds to block 830.

At block 830, the BBDAc 104 loads the remaining image slices. For example, the BBDAc 104 may transfer the slices of the image that have not been transferred to internal memory 106, such that one or more complete boot images are transferred to internal memory 106. In such an example, the BBDAc 104 may transfer the remaining slices of the image based on a sequential order of the slices in the memory device 102. At block 835, the BBDAc 104 may preemptively load the remaining image slices, such that the BBDAc 104 may continue to load the remaining slices of one or more boot images without being required to receive an access request from a compute core. At block 830, the preemptive transfer of image slice may be discontinued, at a block boundary, to load a slice of the image that has been requested by a compute core. For example, the access scheduler circuitry 130 may initiate a transfer of an image slice, which was requested by the foreground DMA circuitry 128, at a block boundary of a slice being preemptively loaded. In such an example, the access scheduler circuitry 130 may complete the transfer of the slice being preemptively loaded as a result of loading the prioritize image slice. Alternatively, the BBDAc 104 may continue to transfer slices of one or more boot images based on a plurality of access requests and/or linearly loading the slices. The MCU 100 proceed to block 835.

At block 835, the MCU 100 bypasses the BBDAc 104. For example, the BBDAc 104 may assert the indication gate 108A of FIG. 1 upon completely transferring a boot image from the memory device 102 to enable the address decoder 108 to access portions of an image directly from internal memory 106 as opposed to receiving the access to a portion of the image through the BBDAc 104. In such an example, the address decoder 108 may bypass the operations of the BBDAc 104 by accessing portions of an image that has been completely transferred to internal memory 106. Advantageously, the duration of time required to access a portion of an image is reduced as a result of bypassing the BBDAc 104. The process proceeds to end.

Although example methods are described with reference to the flowchart illustrated in FIG. 8 many other methods of loading a boot image using the BBDAc 104 and preload headers may be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 9:
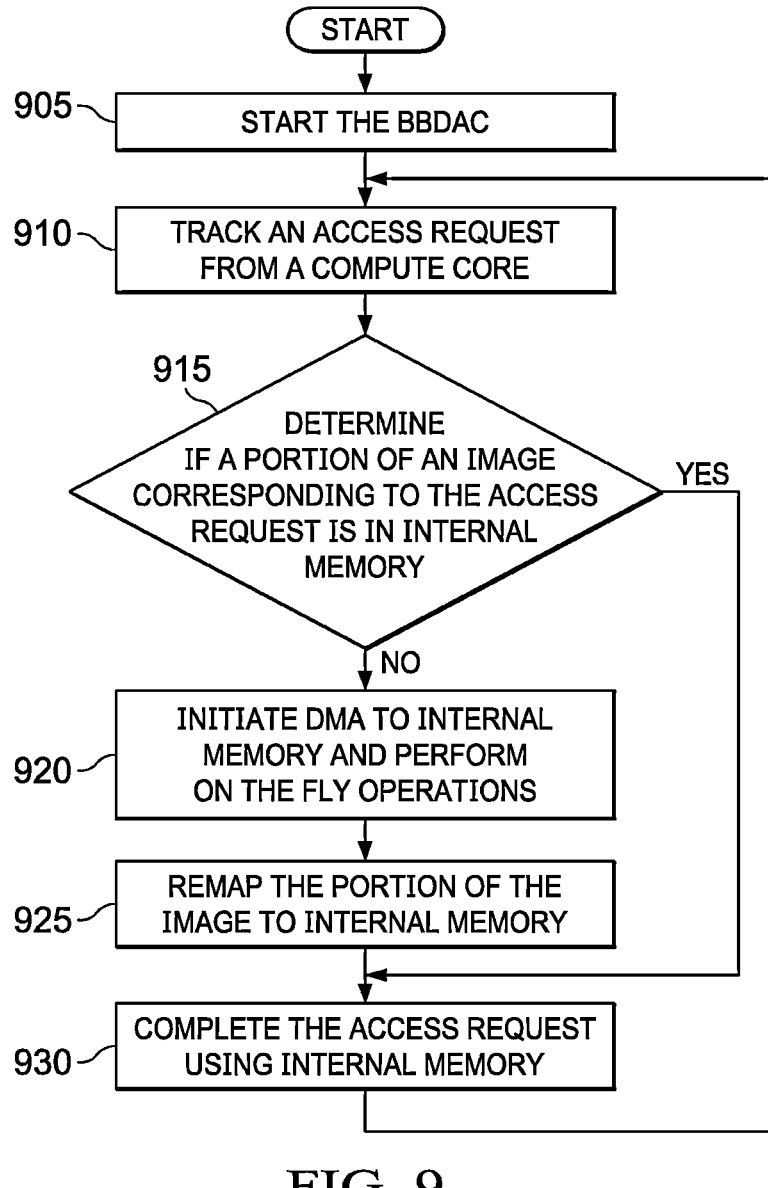
FIG. 9 is a flowchart representative of an example process that may be performed using machine readable instructions that can be executed and/or hardware configured to implement the boot from block device accelerator of FIG. 1, and/or, more generally, to perform the sequence of FIG. 5 to boot the microcontroller unit of FIG. 1 using a plurality of requests from one or more cores.

FIG. 9 is a flowchart representative of an example process that may be performed using machine readable instructions that can be executed and/or hardware configured to implement the BBDAc 104 of FIG. 1, and/or, more generally, to perform the sequences 505 and 510 of FIG. 5 to boot the MCU 100 of FIG. 1 using a plurality of requests from one or more of the compute cores 112 and/or 114. The MCU 100 begins at block 905. At block 905, the MCU 100 starts the BBDAc 104. For example, the MCU 100 may setup the secure zone circuitry 124 processing blocks, configure the DMA circuitry 128 and/or 132 to begin to transfer slices of the image to internal memory 106 of FIG. 1 from the memory device 102 of FIG. 1. The BBDAc 104 proceeds to block 910.

At block 910, the BBDAc 104 receives an access request from a compute core. For example, the first compute core 112 may request access to a slice (e.g., the slices 102B-102E of FIGS. 1 and 2) of the first image 305 of FIG. 3 as a result of indicating to the BBDAc 104 which slice of the first image 305 to transfer. In such an example, the BBDAc 104 may track the access request using the address remapping circuitry 122, such that an access request may either be fulfilled by the foreground DMA circuitry 128 of FIG. 1 or based on a gate (e.g., the gates 122B, 122D, and 122F) direct the access request to internal memory 106. The access request from the compute core may be generated as a result of an application requiring operations of a slice of the boot image prior to a preemptive load of the slice. The address remapping circuitry 122 may track an access request from a compute core as a result of modifying a gate that corresponds to a specified slice within the memory device 102. Advantageously, the BBDAc 104 transfers a slice of an image once as a result the address remapping circuitry 122 tracking each new access request from a compute core using a gate corresponding to the slice indicated within the access request. The BBDAc 104 proceeds to block 915.

At block 915, the BBDAc 104 determines if a portion of an image corresponding to the access request is in internal memory. For example, the BBDAc 104 may indicate to the address decoder 108 that all of the slices associated with an image corresponding to an access request is already stored in internal memory 106 using the indication gate 108A. In such an example, the BBDAc 104 may determine to assert indication gate 108A as a result of determining that all of the gates comprising the address remapping circuitry 122 are asserted. The BBDAc 104 may fulfill an access request by either loading the slice from the memory device 102 using the foreground DMA circuitry 128 or by accessing the portion of the internal memory 106 wherein the slice is stored. For example, the BBDAc 104 may fulfill an access request using the internal memory 106 as a result of determining that the slice was previously loaded from the memory device 102. Alternatively, the BBDAc 104 may determine a slice associated with an access request based on an operation being requested by the compute core 112 or 114. The BBDAc 104 proceeds to block 920 as a result of determining that the slice of the image associated with the access request has not been transferred to internal memory 106. The BBDAc 104 proceeds to block 930 as a result of determining that the slice of an image associated with the access request is already stored in internal memory 106.

At block 920, the BBDAc 104 initiates DMA to internal memory and perform on-the-fly operations. For example, the BBDAc 104 may configure the foreground DMA circuitry 128 of FIG. 1 to transfer the first slice 102B of the first image 305 to internal memory 106. In such an example, the foreground DMA circuitry 128 may perform on-the-fly authentication and/or decompression using the cryptography circuitry 138 of FIG. 1 to authenticate the first slice 102B and/or the decompression engine circuitry 140 of FIG. 1 to decompress the first slice 102B. Advantageously, the BBDAc 104 may perform on-the-fly operations to image slices using the DMA circuitry 128 and/or 132. The BBDAc 104 proceeds to block 925.

At block 925, the BBDAc 104 remaps the portion of the image to internal memory. For example, the foreground DMA circuitry 128 may modify the address remapping circuitry 122 to include a memory address within internal memory 106 that corresponds to the first slice 102B. Advantageously, the address decoder 108 may bypass the BBDAc 104 and access a slice of a boot image directly from the internal memory 106 as a result of determining that the image has been completely transferred to internal memory 106. The BBDAc 104 proceeds to block 930.

At block 930, the BBDAc 104 completes the access request using internal memory. For example, the BBDAc 104 may indicate a memory address within the internal memory 106 corresponding to a slice of an image which has been transferred from the memory device 102 by either of the DMA circuitry 128 or 132. In such an example, the address decoder 108 may store the memory address of each slice to bypass the BBDAc 104 in response to future access requests corresponding to the same slice of the image. Alternatively, the BBDAc 104 may provide the address decoder 108 access to internal memory 106 as a result of determining the slice is stored in internal memory 106. The BBDAc 104 proceeds to block 910. Alternatively, the BBDAc 104 may wait for an access request from the compute cores prior to proceeding to block 910.

Although example methods are described with reference to the flowchart illustrated in FIG. 9 many other methods of loading slices of an image to internal memory using the BBDAc 104 may be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 10:
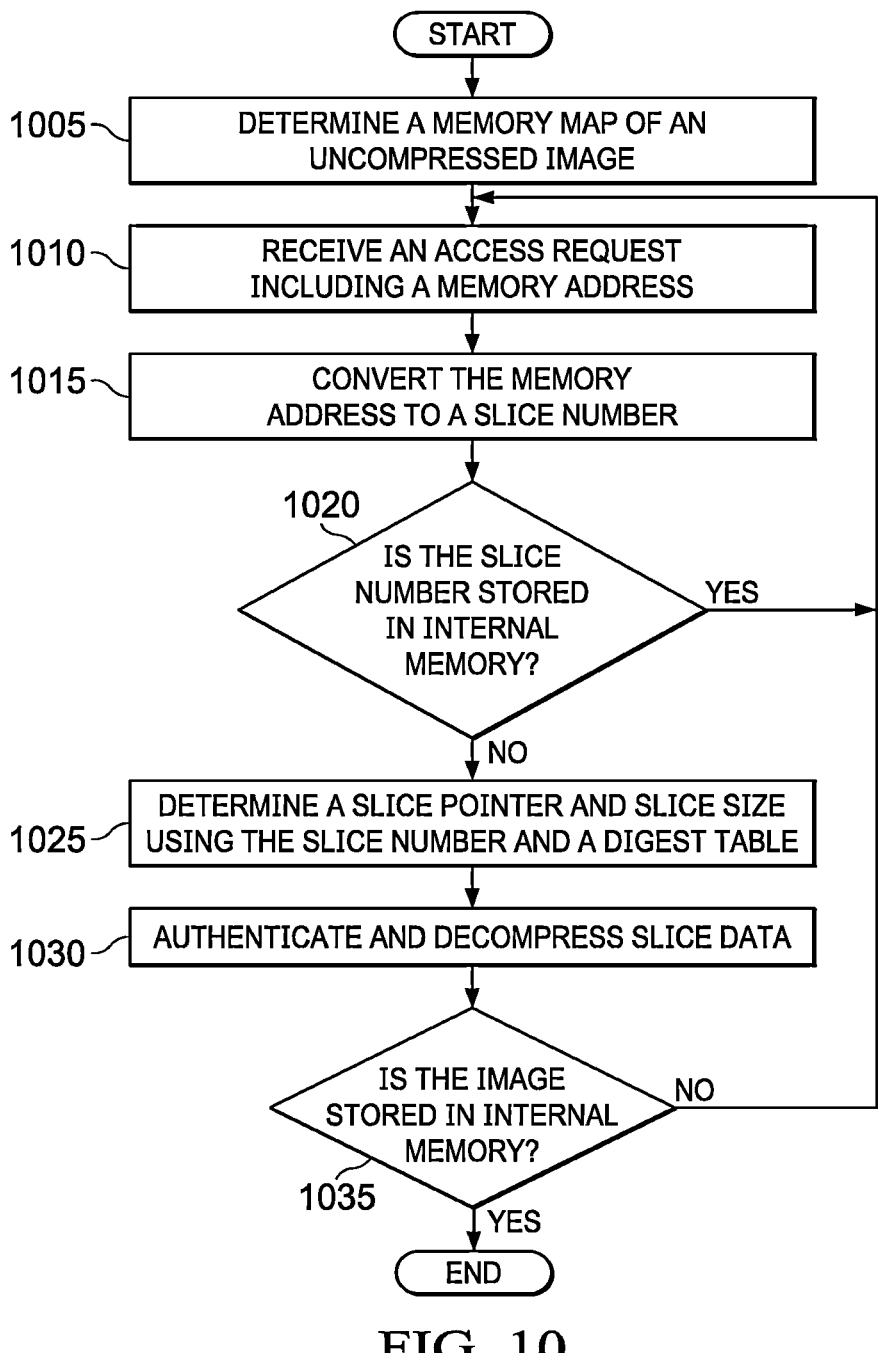
FIG. 10 is a flowchart representative of an example process that may be performed using machine readable instructions that can be executed and/or hardware configured to implement the boot from block device accelerator of FIG. 1, and/or, more generally, to perform on-the-fly operations during the sequence of FIG. 5 to boot the microcontroller unit of FIG. 1 using a plurality of requests from one or more cores.

FIG. 10 is a flowchart representative of an example process that may be performed using machine readable instructions that can be executed and/or hardware configured to implement the BBDAc 104 of FIG. 1, and/or, more generally, to perform on-the-fly operations during the sequence of FIG. 5 to boot the MCU 100 of FIG. 1 using a plurality of requests from one or more cores. The BBDAc 104 begins at block 1005. At block 1005, the BBDAc 104 determines a memory map of an uncompressed image. At block 1005, the memory map includes data to indicate at least one of a memory address, slice number, slice pointer, and/or slice digest data. For example, the BBDAc 104 may perform the operations of blocks 710-825 of FIG. 7. In such an example, the BBDAc 104 generates the slice digest table 136 of FIG. 1 using the signature table 102A of FIGS. 1 and 2, which is loaded at block 710. At block 1005, the BBDAc 104 generates the slice digest table 136 to represent an image stored in the memory device 102 as a linear memory map that represents the slices of the image as a slice number. Such a memory map may be used to preemptively transfer image slices based on an increasing linear address. The slice number corresponds to a slice of the boot image. The slice number may correspond to the slice pointer 225 of FIG. 2, the slice size 230 of FIG. 2, and/or the slice digest 235 of FIG. 2. The BBDAc 104 proceeds to block 1010.

At block 1010, the BBDAc 104 receives an access request including a memory address. For example, the BBDAc 104 may receive an access request from the compute core 112 to request access to a slice corresponding to an operation at a memory address. Alternatively, the BBDAc 104 may determine the memory address corresponding to the access request as a result of determining a memory address corresponding to an operation related to the access request. The BBDAc 104 proceeds to block 1015.

At block 1015, the BBDAc 104 converts the memory address to a slice number. For example, the address remapping circuitry 122 of FIG. 1 may determine the slice number corresponding to the memory address as a result of comparing the memory address to the region address 122A, 122C, and 122E. In such an example, the slice number may be determined based on the region address which corresponds to the memory address. The slice number corresponds to a portion of the slice digest table determined at block 1005. The BBDAc 104 proceeds to block 1020.

At block 1020, the BBDAc 104 determines whether the slice number is stored in internal memory. For example, the address remapping circuitry 122 may determine that the slice number corresponding to the first region address 122A is stored in internal memory as a result of determining the first gate 122B of FIG. 1 is asserted or set to a logical high. In such an example, the address remapping circuitry 122 may determine that the slice number is stored in the memory device 102 as a result of determining that the first gate 122B is deasserted or set to a logical low. The BBDAc 104 may access the slice corresponding to the slice number in internal memory as a result of determining the slice is already in internal memory 106. Advantageously, BBDAc 104 may only load each slice once as a result of using the address remapping circuitry 122 to track loading each slice. The BBDAc 104 proceeds to block 1010 as a result of determining that the slice is in internal memory 106. The BBDAc 104 proceed to block 1025 as a result of determining that the slice number is stored in the memory device 102.

At block 1025, the BBDAc 104 determines a slice pointer and slice size using the slice number and a digest table. For example, the BBDAc 104 may determine the slice pointer 225 and slice size 230 using the slice digest 235 as stored in the slice digest table 136. In such an example, the slice number may be stored in the slice digest 235 or used to determine an offset in the slice digest table 136. The BBDAc 104 may determine a location of the slice information as a result of determining the slice number times a size of each row in the slice digest table 136 may be used to access the slice digest table information for the slice number. For example, a second slice in the slice digest table 136 may be located at a memory address equal to two time a size of a data type used to store the slice pointer 225, slice size 230, and/or slice digest 235. The BBDAc 104 proceeds to block 1030.

At block 1030, the BBDAc 104 authenticates and decompresses slice data. For example, the DMA circuitry 128 and/or 132 may be configured to authenticate and decompress images slices as an image slice is transferred from the memory device 102 using the cryptography circuitry 138 and decompression engine circuitry 140 of FIG. 1. In such an example, a DMA channel used by the DMA circuitry 128 and/or 132 may be configured to perform on-the-fly decompression and authentication, such that the image slice may be authenticated and decompressed at the same time that the image slice is being transferred to internal memory 106. Advantageously, the on-the-fly operations of the DMA circuitry 128 and 132 reduce the duration of time required boot one or more cores in the MCU 100. The BBDAc 104 proceeds to block 1035.

At block 1035, the BBDAc 104 determines if the image is stored in internal memory. For example, the BBDAc 104 may indicate to the address decoder 108 of FIG. 1 that all slices of the boot image have been loaded into internal memory 106. In such an example, the address decoder 108 may assert the indication gate 108A of FIG. 1 and begin to bypass the BBDAc 104 as a result of receiving the indication that the boot image has been completely transferred into internal memory 106. The BBDAc 104 proceeds to block 1010 as a result of determining that the indication gate 108A is set to a logic low and/or deasserted. The BBDAc 104 proceeds to end the process of FIG. 10 as a result of determining that the boot image is completely stored in internal memory, such that the address decoder 108 begins to bypass the BBDAc 104 to fulfill access requests from compute cores.

Although example methods are described with reference to the flowchart illustrated in FIG. 10 many other methods of performing on-the-fly operations during the process of loading slices of an image to internal memory using the BBDAc 104 may be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 11:
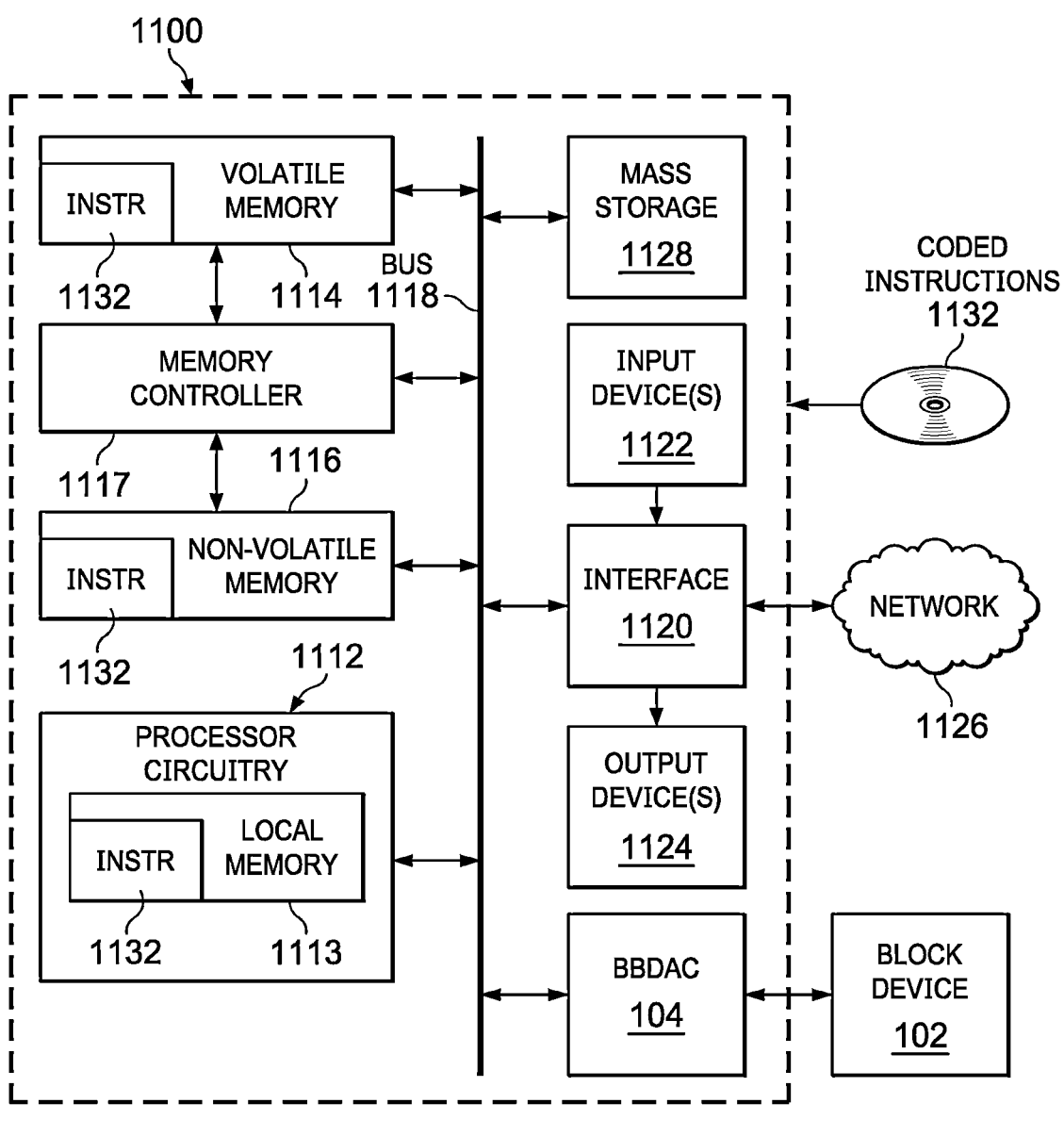
FIG. 11 is a block diagram of an example processing platform including processor circuitry structured to execute the example machine readable instructions and/or the example operations of FIGS. 6-9 to implement the boot from block device accelerator of FIG. 1.

FIG. 11 is a block diagram of an example processing platform including processor circuitry structured to execute the example machine readable instructions and/or the example operations of FIGS. 7-10 to implement the BBDAc 104 of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements blocks 605-625 of FIG. 6.

The processor circuitry 1112 of the illustrated example includes an internal memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUSR Dynamic Random Access Memory (RDRAMR), and/or any other type of RAM device. The non-volatile memory 1116 may be implemented by flash memory and/or any other desired type of memory device. Access to the main memory 1114, 1116 of the illustrated example is controlled by a memory controller 1117. In this example, the BBDAc 104 of FIG. 1 is coupled to the bus 1118. Alternatively, the BBDAc 104 may be included in the processor circuitry 1112 or interface circuitry 1120. Advantageously, the BBDAc 104 may be used to transfer data from any block device internal or external to the processor platform 1100.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIGS. 7-10, may be stored in the mass storage device 1128, in the volatile memory 1114, in the non-volatile memory 1116, and/or on one non-transitory computer readable storage medium such as a NAND flash, CD, or DVD.

In this description, the term "and/or" (when used in a form such as A, B and/or C) refers to any combination or subset of A, B, C, such as: (a) A alone; (b) B alone; (c) C alone; (d) A with B; (c) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

A flowchart representative of example hardware logic circuitry, machine readable instructions, hardware implemented state machines, and/or any combination thereof for implementing the MCU 100 of FIG. 1 is shown in FIGS.

6-10. The machine readable instructions may be one or more executable programs or portion(s) of an executable program for execution by processor circuitry, such as the processor circuitry 1112 shown in the example processor platform 1100 discussed below in connection with FIG. 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6-10, many other methods of implementing the MCU 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but may utilize addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and a non-transitory computer readable storage medium are expressly defined to include any type of computer readable storage device and/or storage disk and to exclude propagating signals and to exclude transmission media.

Modifications are possible in the described embodiments, and other embodiments are possible, within the scope of the claims.

What is claimed is:

1. A device comprising:
   a first interface configured to couple to a first memory configured to store an image that includes a set of slices;
   a second interface configured to couple to a second memory;
   a direct memory access circuit coupled to the first and second interfaces and configured to:
       receive a transaction that specifies a read of a slice of the set of slices; and
       based on the transaction:
           read the slice from the first memory;

perform operations to the slice; and
    store the slice in the second memory; and
address remapping circuitry coupled to the direct memory
    access circuit, the address remapping circuitry config-
    ured to:
    track transactions between the direct memory access
        circuit and the second memory; and
    assert a signal corresponding to the slice and indicating
        that the slice is stored in the second memory.
2. The device of claim 1, wherein:
the direct memory access circuit is a first direct memory
    access circuit; and
the device further comprises a second direct memory
    access circuit coupled to the first and second interfaces
    and configured to, based on a second slice of the set of
    slices of the image being read from the first memory
    and stored in the second memory, cause a third slice of
    the set of slices to be read from the first memory and
    stored in the second memory.
3. The device of claim 1, further comprising an access
scheduler circuit coupled to the direct memory access cir-
cuit, the access scheduler circuit is configured to:
    determine a priority of the transaction based on initiation
        of the transaction; and
    control access to the first memory based on the priority of
        the transaction.
4. The device of claim 3, wherein the access scheduler
circuit is configured to determine that the priority of the
transaction is a high priority as a result of determining a
processor core initiated the transaction.
5. The device of claim 3, wherein the access scheduler
circuit is configured to determine the priority of the trans-
action is a low priority as a result of determining a pre-
emptive load operation initiated the transaction.
6. The device of claim 1, wherein the address remapping
circuitry is configured to:

access the slice in the second memory as a result of
    receiving the transaction from a processor core to
    access operations of the slice.
7. The device of claim 6, further comprising a third
interface configured to couple to the processor core.
8. The device of claim 7, further comprising an address
decoder coupled to the third interface, the address decoder
configured to:
    receive the transaction from the processor core to access
        the slice;
    assert an indication gate as a result of receiving an
        indication from the first interface that the set of slices
        of the image are stored in the second memory;
    access the slice in the second memory as a result of the
        indication gate indicating the set of slices are stored in
        the second memory; and
    transmit the transaction to the address remapping circuitry
        as a result of the indication gate indicating that one or
        more portions of the set of slices are stored in the first
        memory.
9. The device of claim 1, further comprising secure zone
circuitry coupled to the direct memory access circuit, the
secure zone circuitry to:
    store a slice digest table including at least one of a slice
        number, slice pointer, or authentication information for
        slices comprising the set of slices;
    decompress the slice using decompression engine cir-
        cuitry; and
    authenticate the slice based on a comparison of a digital
        signature of the slice to a verified digital signature
        stored in the slice.
10. The device of claim 1, wherein the operations of the
direct memory access circuit includes at least one of authen-
tication or decompression.
11. The device of claim 1, wherein the operations of the
direct memory access circuit are performed on-the-fly.

* * * * *